(12) United States Patent
Frenger et al.

(10) Patent No.: US 12,028,131 B2
(45) Date of Patent: Jul. 2, 2024

(54) APPARATUSES AND METHODS FOR SEQUENTIAL TRANSMIT PRECODING

(71) Applicant: Telefonaktiebolaget LM Ericsson (publ), Stockholm (SE)

(72) Inventors: Pål Frenger, Linköping (SE); Erik G. Larsson, Linköping (SE); Emil Björnson, Hägersten (SE); Martin Hessler, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 55 days.

(21) Appl. No.: 17/637,106

(22) PCT Filed: Aug. 30, 2019

(86) PCT No.: PCT/SE2019/050812
§ 371 (c)(1),
(2) Date: Feb. 22, 2022

(87) PCT Pub. No.: WO2021/040591
PCT Pub. Date: Mar. 4, 2021

(65) Prior Publication Data
US 2022/0302967 A1 Sep. 22, 2022

(51) Int. Cl.
*H04B 7/0456* (2017.01)
*H04B 7/0452* (2017.01)
*H04B 7/06* (2006.01)

(52) U.S. Cl.
CPC ......... *H04B 7/0456* (2013.01); *H04B 7/0452* (2013.01); *H04B 7/0626* (2013.01)

(58) Field of Classification Search
CPC .... H04B 7/022; H04B 7/0413; H04B 7/0452; H04B 7/0456; H04B 7/0626; H04L 5/0016; H04L 5/0023; H04L 5/0035
See application file for complete search history.

(56) References Cited

U.S. PATENT DOCUMENTS

| | | | |
|---|---|---|---|
| 2008/0192856 A1* | 8/2008 | Jongren | H04B 7/0617 375/267 |
| 2011/0305291 A1* | 12/2011 | Marzetta | H04B 7/0452 375/267 |
| 2014/0016583 A1 | 1/2014 | Smith | |

FOREIGN PATENT DOCUMENTS

WO 2018103897 A1 6/2018

OTHER PUBLICATIONS

Bertilsson, E, et al., "A Scalable Architecture for Massive MIMO Base Stations Using Distributed Processing", 50th Asilomar Conference on Signals, Systems and Computers, Pacific Grove (CA), USA, 2016, 5 pages.

(Continued)

*Primary Examiner* — David S Huang
(74) *Attorney, Agent, or Firm* — Murphy, Bilak & Homiller, PLLC

(57) ABSTRACT

The present disclosure relates to radio network communication. In one of its aspects, the present disclosure relates to a method, performed by a first APU, for sequential transmit precoding in a radio stripe system. The system comprises at least two APUs connected 5 in series from a CPU and serves at least two UEs. According to the method, channel estimates for channels to the served UEs are obtained and based on these, a precoding filter is determined. The precoding filter is going to be applied to signals that are to be transmitted from the first APU to the UEs. Thereafter, based on the determined precoding filter and the obtained channel estimates, effective precoded channels for the 0 signals to the UEs are determined. These represent the effective channel created after the precoding filter being applied to each channel for the UEs. The effective precoded channels are transmitted to at least one subsequent second APU.

15 Claims, 12 Drawing Sheets

(56) References Cited

OTHER PUBLICATIONS

Interdonato, Giovanni, "Signal Processing Aspects of Cell-Free Massive MIMO", Linköping Studies in Science and Technology Licentiate Thesis No. 1817, Licentiate Thesis, Linkoping University, Sep. 21, 2018, 49 pages.

Interdonato, G., et al., "Ubiquitous Cell-Free Massive MIMO Communications", arXiv: 1804.03421v1, Apr. 10, 2018, 19 pages.

Moghadam, Nima N., et al., "Pilot Precoding and Combining in Multiuser MIMO Networks", arXiv:1611.01950v2, 2016, 14 pages.

Rodriguez Sanchez, Jesus, et al., "Decentralized Massive MIMO Processing Exploring Daisy-chain Architecture and Recursive Algorithms", arXiv:1905.0316v1, May 8, 2019, 12 pages.

Sarajlic, Muris, et al., "Fully Decentralized Approximate Zero-Forcing Precoding for Massive MIMO Systems", IEEE Wireless Communications Letters, vol. 8, No. 3, Jun. 2019, 4 pages.

Shaik, Zakir Hussain, et al., "Cell-Free Massive MIMO With Radio Stripes and Sequential Uplink Processing", arXiv:2003.02940v1, Mar. 5, 2020, 6 pages.

Shepard, Clayton, et al., "Argos: Practical Many-Antenna Base Stations", Mobile Computing and Networking, ACM, 2 Penn Plaza, Suite 701 New York NY 10121-0701, USA, XP058009203, DOI: 10.1145/2348543.2348553, ISBN: 978-1-4503-1159-5, Aug. 22, 2012, pp. 53-64.

\* cited by examiner

APPARATUSES AND METHODS FOR SEQUENTIAL TRANSMIT PRECODING

TECHNICAL FIELD

The present disclosure generally relates to telecommunications. In particular, the various embodiments described in this disclosure relate to apparatuses and methods for sequential transmit precoding in a radio stripe system.

BACKGROUND

This section is intended to provide a background to the various embodiments of the invention that are described in this disclosure. Therefore, unless otherwise indicated herein, what is described in this section should not be interpreted to be prior art by its mere inclusion in this section.

Traditionally, cellular networks comprise a set of base stations equipped with an array of co-located antenna elements, each forming one or multiple antenna ports. When a User Equipment (UE), or terminal, has data packets to receive in the downlink or transmit in the uplink, it is first associated with one of the base stations and then it is scheduled for transmission on a block of time-frequency resources. In these resource blocks, the serving base station array forms a beam towards the UE, with a spatial signature that is selected based on the spatial position of the UEs and other UEs that are active in the same block. The beam is typically selected to balance between high received signal power at the UE and little interference towards the other UEs that are active in the same block. Each base station and the UEs that it serves constitutes a cell and all desired transmission goes on within the cell. Resource allocation tasks, such as scheduling, power control, and assignment of pilot sequences, are also implemented on a per-cell basis.

An alternative approach to network deployment is to spread out the antennas over the coverage area, using many remote-radio heads, also known as Access Points (APs) or Antenna Processing Units (APUs). Different from traditional cellular networks, where the base stations are surrounded by UEs, the UEs will be surrounded by AP antennas that may all potentially serve them simultaneously. This enables a cell-free network operation where each UE is served by its preferred set of APUs. Large-scale deployment of such networks is known as "Cell-free Massive Multiple-Input Multiple-Output (MIMO)". The physical-layer processing is partially done locally at each APU, using uplink measurements from reference signals (pilots).

One way to deploy these cell-free massive MIMO networks is to use radio stripes, where multiple APUs are deployed along the same cable and thereby shares the same fronthaul connection. This may lead to less cabling compared to a star-topology where each APU has a dedicated fronthaul connection. Within the radio stripe, antennas and the associated APUs are serially located inside the same cable, which also provides time and frequency synchronization, data transfer, and power supply via a shared bus. The APU may comprise of antenna elements and circuit-mounted chips (including power amplifiers, phase shifters, filters, modulators, A/D and D/A converters) inside a protective casing of a flexible cable or a stripe. One or more APUs may also be implemented in a non-flexible radio stick that are serially connected to other radio sticks. Each radio stripe or set of radio sticks may then be connected to one or multiple Central Processing Units (CPUs). Since the total number of distributed antennas is assumed to be large, the transmit power of each antenna can be very low, resulting in low heat-dissipation, small volume and weight, and low cost. For example, if the carrier frequency is 5.2 GHz then the antenna size is approximately 2.8-2.9 cm, and for higher carrier frequencies the antenna elements further decreased in size. Thus, the antennas and processing hardware can be easily fitted in a cable/stripe.

SUMMARY

Radio stripe systems may facilitate a flexible and cost efficient implementation of a cell-free Massive Multiple-Input Multiple-Output (MIMO) deployment.

The receive/transmit processing of an antenna in a radio stripe system is performed right next to itself. On the transmitter side, each Antenna Processing Unit (APU) receives multiple streams of input data (e.g. one stream per User Equipment (UE), or terminal, one UE with multiple streams, or some other UE-stream allocation) from the previous APU via the shared bus. In each antenna, the input data streams are scaled with a pre-calculated precoding vector and the sum-signal is transmitted over the radio channel to the receiver(s). By exploiting channel reciprocity, the precoding vector may be a function of the estimated uplink channels. For example, if the conjugate of the estimated uplink channel is used, Maximum Ratio (MR) precoding is obtained. This precoding requires no Channel State Information (CSI) sharing between the antennas.

On the receiver side, the received radio signal is multiplied with the combining vector previously calculated in the uplink pilot phase. The output gives data streams that are then combined with the data streams received from the shared bus and sent again on the shared bus to the next APU.

Joint transmission from multiple distributed APUs is mainly beneficial, compared with single-APU transmission, if the transmission is carried out phase-coherently, so that an array gain is obtained. Methods developed for cell-free massive MIMO and radio stripes may be divided into two categories:

Distributed per-APU processing, also known as maximum ratio transmission or conjugate beamforming. This enables a distributed implementation with no sharing of CSI between APUs, but does not support interference suppression where APUs actively cancel each other's signals at undesired locations, e.g., using zero-forcing. The contributions from the different APUs can be appropriately weighted depending on the path loss differences, but this does not cancel interference. Interference is a main limiting factor with this type of processing.

Centralized processing: All APUs may send their CSI over the fronthaul to a CPU that computes a network-wide precoding method and that can apply conventional interference suppression methods, e.g., zero-forcing. The CPU then sends the precoded signals over the fronthaul to each APU. The problem is that this requires a huge fronthaul capacity that grows proportionally with the number of APUs in the network and with the number of users that these APUs serve.

Both the distributed per-APU processing and the centralized processing methods are methods with drawbacks. The distributed per-APU processing method has low performance, relative to what is obtainable by centralized processing, and the centralized processing method has huge, unscalable fronthaul capacity requirements. Accordingly, there is a need for a scalable solution that enables transmission in a distributed MIMO system that has interference suppression capabilities.

It is in view of the above background and other considerations that the various embodiments of the present disclosure have been made.

It is proposed to provide a solution to address this problem, i.e. implementing interference suppression in a sequential manner, by the APUs computing their local precoders sequentially during downlink data transmission.

This general object has been addressed by the appended independent claims. Advantageous embodiments are defined in the appended dependent claims.

According to a first aspect, there is provided a method for sequential transmit precoding in a radio stripe system. The radio stripe system comprises at least two APUs and a CPU, wherein the at least two APUs are connected in series from the CPU. The radio stripe system serves at least two UEs. The method is performed by a first APU.

The method comprises obtaining channel estimates for channels to the at least two UEs and determining a precoding filter based on the obtained channel estimates. The precoding filter is going to be applied to signals that are to be transmitted from the first APU to the at least two UEs. The method further comprises determining effective precoded channels for the signals to the at least two UEs based on the determined precoding filter and the obtained channel estimates. The effective precoded channels represent the effective channel created after the precoding filter being applied to each channel for the at least two UEs. Thereafter, the method comprises transmitting the effective precoded channels to at least one subsequent second APU located further from the CPU.

In some embodiments, the method further comprises receiving data signals from the CPU and applying the determined precoding filter to the received data signals to generate a precoded signal. The method further comprises transmitting the precoded signal to the at least two UEs served by the radio stripe system.

In some embodiments, the obtained channel estimates are CSI obtained from reference pilot signals transmitted by the at least two UEs served by the radio stripe system.

In some embodiments, the precoding filter is generated by a method selected from the group comprised of: maximum-ratio transmission (MRT), zero-forcing (ZF) precoding and signal-to-interference-and-leakage ratio (SLNR) precoding.

In some embodiments, each of the at least two APUs in the radio stripe system is equipped with one antenna.

In some embodiments, the at least one subsequent second APU is located further from the CPU than the first APU.

In some embodiments, the radio stripe system have a tree structure and the first APU is connected to two subsequent second APUs located further away from the CPU. The effective precoded channels are transmitted to both subsequent second APUs.

According to a second aspect, there is provided a method for sequential transmit precoding in a radio stripe system. The radio stripe system comprises at least two APUs and a CPU, wherein the at least two APUs are connected in series from the CPU. The radio stripe system serves at least two UEs. The method is performed by a second APU.

The method comprises obtaining channel estimates for channels to the at least two UEs and receiving effective precoded channels from at least one preceding first APU. The method further comprises determining a precoding filter based on the obtained channel estimates and the received effective precoded channels from said at least one preceding first APU. The precoding filter is going to be applied to signals that are to be transmitted from the second APU to the at least two UEs.

In some embodiments, the method further comprises receiving data signals from the CPU and applying the determined precoding filter to the received data signals to generate a precoded signal. Thereafter, the method comprises transmitting the precoded signal to the at least two UEs served by the radio stripe system.

In some embodiments, the method further comprises determining effective precoded channels for the signals to the at least two UEs based on the determined precoding filter and the obtained channel estimates. The effective precoded channels represent the effective channel created after the precoding filter being applied to each channel for the at least two UEs. Thereafter, the method comprises transmitting the effective precoded channels to at least one subsequent third APU located further from the CPU.

In some embodiments, the obtained channel estimates are CSI obtained from reference pilot signals transmitted by the at least two UEs served by the radio stripe system.

In some embodiments, the precoding filter is generated by a method selected from the group comprised of: MRT, ZF precoding and SLNR precoding.

In some embodiments, each of the at least two APUs in the radio stripe system is equipped with one antenna.

In some embodiments, the at least one preceding first APU is located closer to the CPU than the second APU.

According to a third aspect, there is provided a first APU configured to perform the method according to the first aspect.

The first APU is configured for sequential transmit precoding in a radio stripe system. The radio stripe system comprises at least two APUs and a CPU, the at least two APUs being connected in series from the CPU. The radio stripe system serves at least two UEs. The first APU comprises a processing circuitry and a memory circuitry. The memory circuit stores computer program code which, when run in the processing circuitry, causes the first APU to obtain channel estimates for channels to the at least two UEs and to determine a precoding filter based on the obtained channel estimates. The precoding filter is going to be applied to signals that are to be transmitted from the first APU to the at least two UEs. The first APU is further caused to determine effective precoded channels for the signals to the at least two UEs based on the determined precoding filter and the obtained channel estimates. The effective precoded channels represent the effective channel created after the precoding filter being applied to each channel for the at least two UEs. Thereafter, the first APU is further caused to transmit the effective precoded channels to at least one subsequent second APU.

In some embodiments, the first APU further comprises a transmitter, or a transmitting circuitry, configured to transmit data to other apparatuses, such as the at least one subsequent second APU. In some embodiments the first APU further comprises a receiver, or a receiving circuitry, configured to receive data from other apparatuses, such the CPU or at least one UE.

In some embodiments, the memory circuitry storing computer program code which, when run in the processing circuitry, further causes the first APU to receive data signals from the CPU and to apply the determined precoding filter to the received data signals to generate a precoded signal. The first APU is further caused to transmit the precoded signal to the at least two UEs served by the radio stripe system.

In some embodiments, the obtained channel estimates are CSI obtained from reference pilot signals transmitted by the at least two UEs served by the radio stripe system.

In some embodiments, the precoding filter is generated by a method selected from the group comprised of: MRT, ZF precoding and SLNR precoding.

In some embodiments, each of the at least two APUs in the radio stripe system is equipped with one antenna.

In some embodiments, the at least one subsequent second APU is located further from the CPU than the first APU.

In some embodiments, the radio stripe system has a tree structure and the first APU is connected to two subsequent second APUs located further away from the CPU. The effective precoded channels are transmitted to both subsequent second APUs.

According to a fourth aspect, there is provided a second APU configured to perform the method according to the second aspect.

The second APU is configured for sequential transmit precoding in a radio stripe system. The second APU comprises a processing circuitry and a memory circuitry. The radio stripe system comprises at least two APUs and a CPU, the at least two APUs being connected in series from the CPU, wherein the radio stripe system serves at least two UEs. The memory circuit stores computer program code which, when run in the processing circuitry, causes the second APU to obtain channel estimates for channels to the at least two UEs and to receive effective precoded channels from at least one preceding first APU. The second APU is further caused to determine a precoding filter based on the obtained channel estimates and the received effective precoded channels from said at least one preceding first APU. The precoding filter is going to be applied to signals that are to be transmitted from the second APU to the at least two UEs.

In some embodiments, the second APU further comprises a transmitter, or a transmitting circuitry, configured to transmit data to other apparatuses, such as the at least one subsequent third APU. In some embodiments the second APU further comprises a receiver, or a receiving circuitry, configured to receive data from other apparatuses, such as the at least one preceding first APU.

In some embodiments, the memory circuitry storing computer program code which, when run in the processing circuitry, further causes the second APU to receive data signals from the CPU and to apply the determined precoding filter to the received data signals to generate a precoded signal. The second APU is further caused to transmit the precoded signal to the at least two UEs served by the radio stripe system.

In some embodiments, the memory circuitry storing computer program code which, when run in the processing circuitry, further causes the second APU to determine effective precoded channels for the signals to the at least two UEs based on the determined precoding filter and the obtained channel estimates. The effective precoded channels represent the effective channel created after the precoding filter being applied to each channel for the at least two UEs. The second APU is further caused to transmit the effective precoded channels to at least one subsequent third APU located further from the CPU.

In some embodiments, the obtained channel estimates are CSI obtained from reference pilot signals transmitted by the at least two UEs served by the radio stripe system.

In some embodiments, the precoding filter is generated by a method selected from the group comprised of: MRT, ZF precoding and SLNR precoding.

In some embodiments, each of the at least two APUs in the radio stripe system is equipped with one antenna.

In some embodiments, the at least one preceding first APU is located closer to the CPU than the second APU.

According to a fifth aspect, there is provided a computer program, comprising instructions which, when executed on a processing circuitry, cause the processing circuitry to carry out the method according to the first aspect and/or the second aspect.

According to a sixth aspect, there is provided a carrier containing the computer program of the fifth aspect, wherein the carrier is one of an electronic signal, optical signal, radio signal, or computer readable storage medium.

The various proposed embodiments herein provide a scalable solution for enabling transmission in a distributed MIMO system that has interference suppression capabilities.

BRIEF DESCRIPTION OF THE DRAWINGS

These and other aspects, features and advantages will be apparent and elucidated from the following description of various embodiments, reference being made to the accompanying drawings, wherein.

DETAILED DESCRIPTION

The present invention will now be described more fully hereinafter. The present invention may, however, be embodied in many different forms and should not be construed as limited to the embodiments set forth herein; rather, these embodiments are provided by way of example so that this disclosure will be thorough and complete, and will fully convey the scope of the invention to those persons skilled in the relevant art. Like reference numbers refer to like elements throughout the description.

In one of its aspects, the disclosure presented herein concerns a method for sequential transmit precoding in a radio stripe system.

Figure 1:
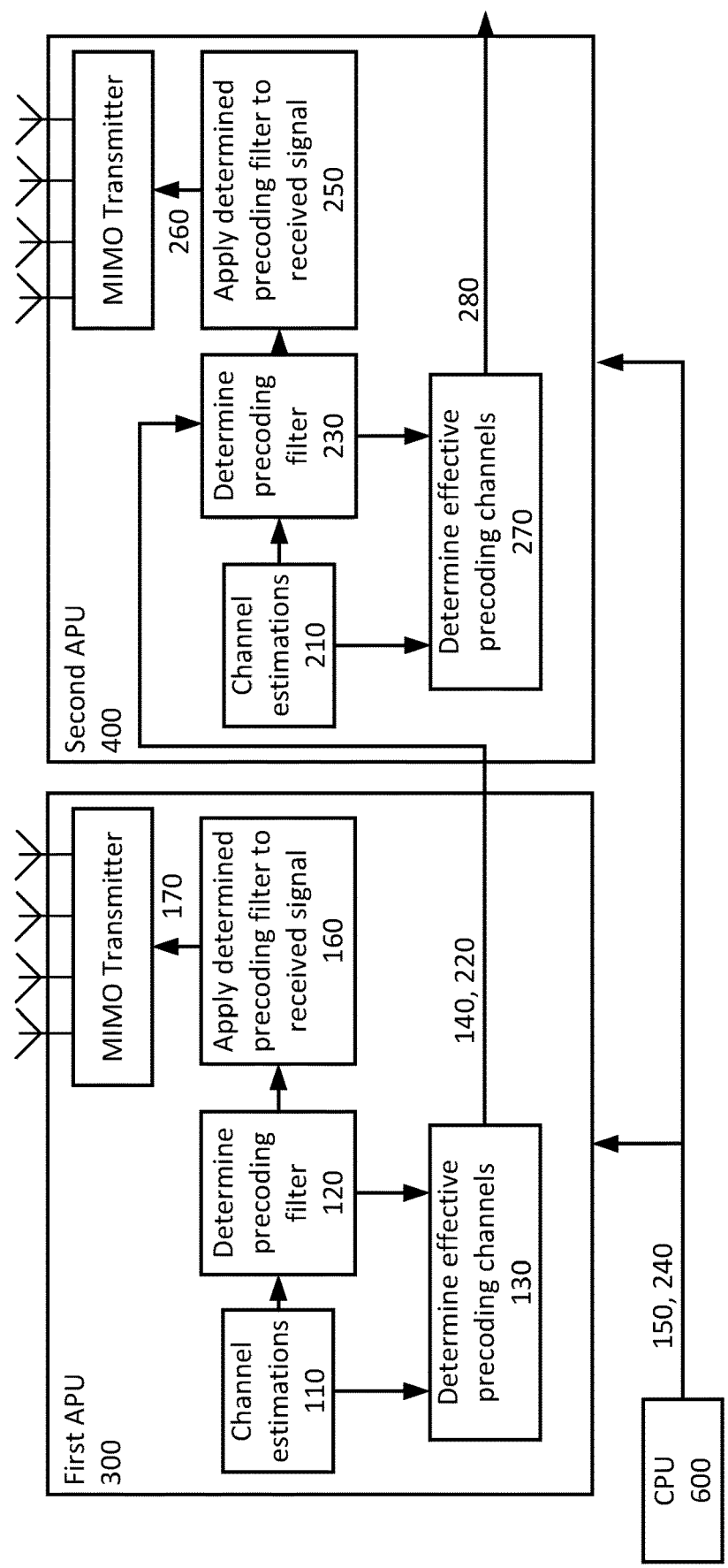
FIG. 1 illustrates a message sequence chart of a process for sequential transmit precoding in a radio stripe system.
Figure 2:
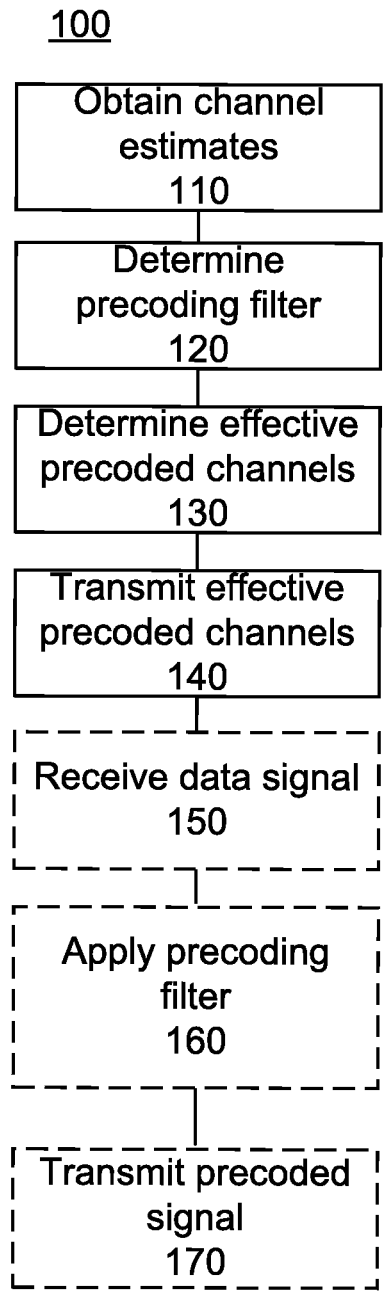
FIG. 2 is a flowchart of an example method performed by a first APU.
Figure 3:
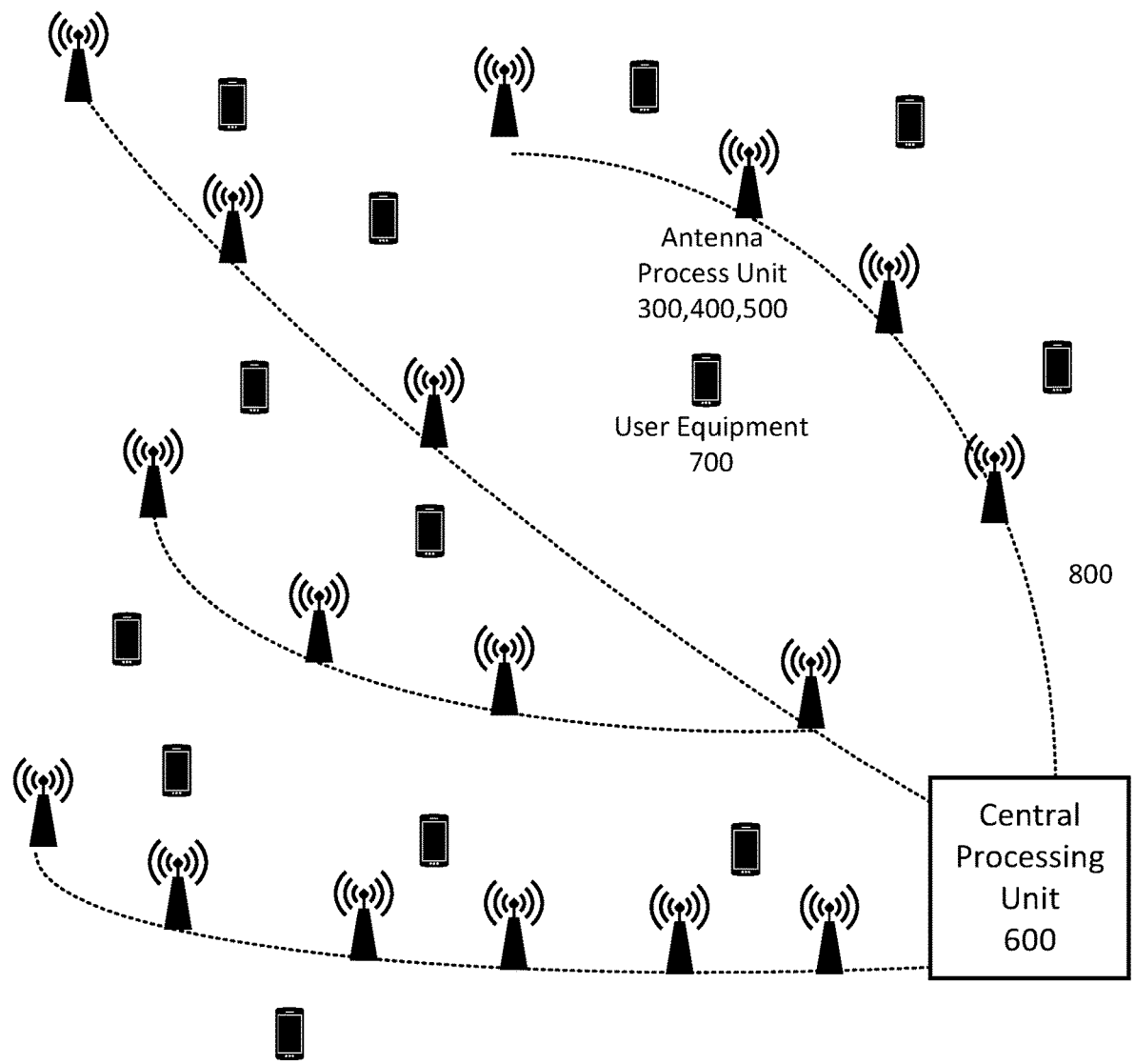
FIG. 3 shows an example of a radio stripe system.

With reference to FIGS. 1 and 2, a first embodiment will now be described. FIG. 1 illustrates a message sequence chart of a process for sequential transmit precoding in a radio stripe system. FIG. 2 illustrates a method 100, performed by a first Antenna Processing Unit (APU), for sequential transmit precoding in a radio stripe system. The radio stripe system comprises at least two APUs and a Central Processing Unit (CPU). The at least two APUs are connected in series from the CPU. The radio stripe system serves at least two User Equipment (UEs), or terminals. FIG. 3 illustrates an example of such radio stripe system. As seen in FIG. 3, each radio stripe may comprise multiple APUs, or Access Points (APs), deployed along the same fronthaul connection to a central unit, a cloud-processor, also called the CPU 600. In some embodiments, the CPU 600 may be called a stripe station or a network node. The radio stripe system 800 may be comprised in a cell-free distributed (massive) Multiple-Input Multiple-Output (MIMO) network.

The method 100 starts at step 110 with the first APU 300 obtaining channel estimates for channels to the at least two UEs 700 served by the radio stripe system 800. The obtained channel estimates may be Channel State Information (CSI) obtained from reference pilot signals transmitted by the at least two served UEs 700. Based on the obtained channel estimates, a precoding filter is determined in step 120. The precoding filter is going to be applied to signals that are to be transmitted from the first APU 300 to the at least two UEs 700. The precoding filter may, for example, be generated by a method selected from the group comprised of: Maximum-Ratio Transmission (MRT), Zero-Forcing (ZF) precoding and Signal-to-interference-and-Leakage Ratio (SLNR) precoding. Alternatively, the precoding filter may be generated by another method.

Thereafter the method 100 continues at step 130 with determining effective precoded channels for the signals to the at least two UEs 700 based on the determined precoding filter and the obtained channel estimates. The effective precoded channels represent the effective channel created after the precoding filter being applied to each channel for the at least two UEs 700.

At step 140, the effective precoded channels are transmitted to at least one subsequent APU 400. The at least one subsequent second APU 400 may be located further from the CPU 600 than the first APU 300. If it is assumed that the radio stripe system 800 serves K number of UEs 700, $K^2$ scalar coefficients will be transmitted to the at least one subsequent second APU 400. The $K^2$ scalar coefficients represent the effective K×K channels created after application of the precoding filter for each of the K served UEs 700.

The proposed method 100 is a scalable method that enables transmission in distributed MIMO systems that have interference suppression capabilities. The method 100 considers downlink transmission where the APUs have obtained channel estimates and utilizes this information to transmit payload data in the downlink. The aim is to precode the signals intended for the served UEs in such way that the collectively transmitted signals by all APUs achieve interference suppression, without gathering all the channel estimates at the CPU or some other central entity in the network. The proposed method 100 achieves this by using the sequential topology of the fronthaul in radio stripe systems 800 to implement interference suppression in a sequential manner. The first APU 300 makes a local decision based on its locally obtained channel estimation and thereafter transmits this information to at least one second APU 400. This will enable suppression of the interference that the first APU 300 may cause the at least one second APU 400. The proposed method 100 overcomes the drawbacks that existing solutions have, which are that the existing solutions either are distributed, but lacks interference suppression capability, or support interference suppression, but require a centralized implementation with heavy fronthaul traffic. The proposed method 100 may greatly increase the achievable rates, since cell-free networks typically operate at high Signal-to-Noise-Ratio (SNR) where the system performance is interference limited.

In some embodiments, the radio stripe system 800 may have a tree structure. An example of such tree structure is illustrated in FIG. 3. The first APU 300 may then be connected to two subsequent second APUs 400. These two subsequent APUs 400 are then located further away from the CPU 600 than the first APU 300. When the radio stripe system 800 has a tree structure, the effective precoded channels may then be transmitted to both these subsequent second APUs 400. This enables the use of the proposed method 100 with flexible radio stripe systems 800, which radio stripe systems 800 may take several different forms.

In some embodiments, the method 100 may further comprise step 150 of receiving data signals from the CPU 600 and the step 160 of applying the determined precoding filter to the received data signals to generate precoded signals. Thereafter, the method may comprise the step 170 of transmitting the precoded signal to the at least two UEs 700 served by the radio stripe system 800. Thereby, with the proposed method 100, there will be no interference between the served UEs 700 as the first APU 300 will transmit signals that have been applied with the determined precoding filter.

In some embodiments, each of the at least two APUs 300,400 in the radio stripe system 800 may be equipped with one antenna. In other embodiments, at least one of the at least two APUs 300,400 may have multiple antennas.

According to a second aspect, there is provided a method, performed by a second APU for sequential transmit precoding in a radio stripe system 800.

Figure 4:
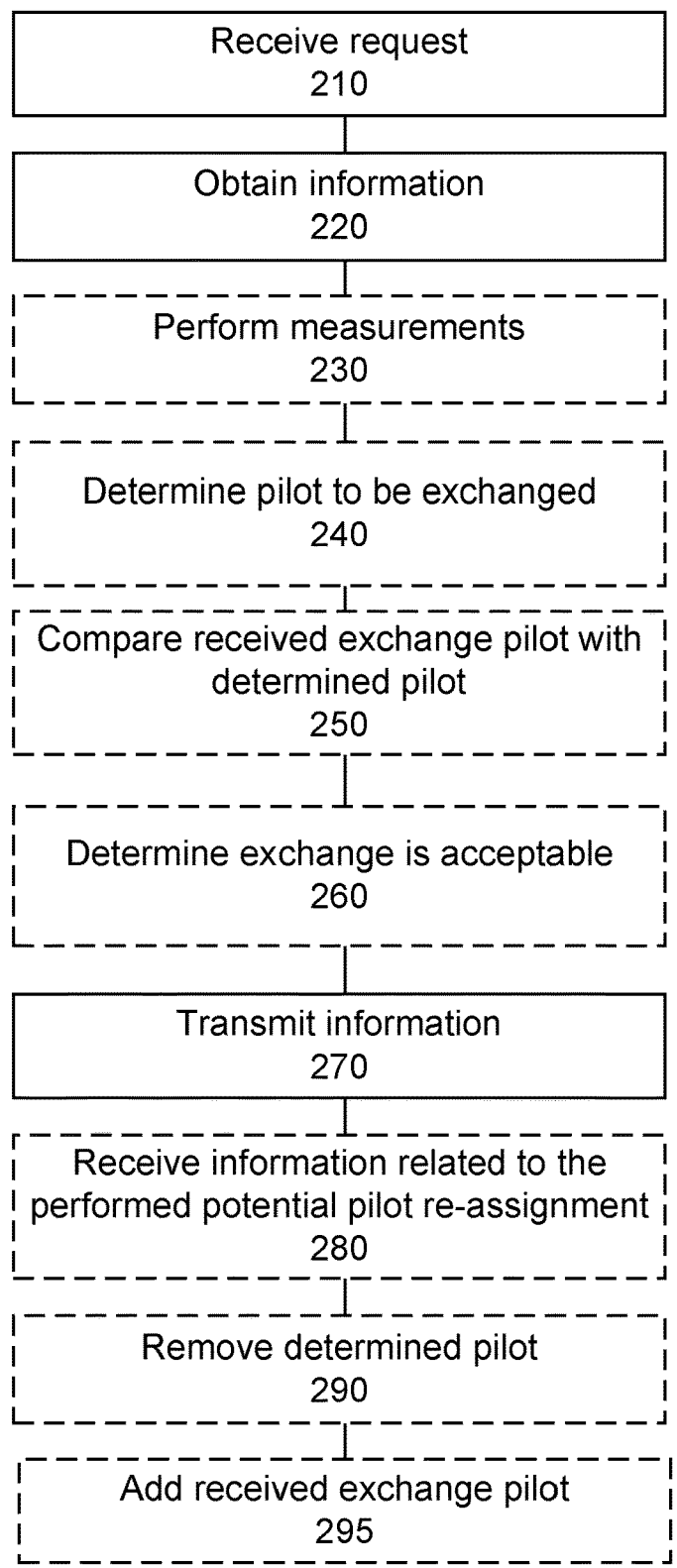
FIG. 4 is a flowchart of an example method performed by a second APU.

The method 200 is now going to be described with reference to the FIGS. 1 and 4. As previously mentioned, FIG. 1 illustrates a message sequence chart of a process for sequential transmit precoding in a radio stripe system 800. FIG. 4 illustrates the method 200, performed by the second APU 400, for sequential transmit precoding in a radio stripe system 800. The radio stripe system 800 comprises at least two APUs 300,400 and a CPU 600, the at least two APUs 300,400 being connected in series from the CPU 600. The radio stripe system 800 serves at least two UEs 700. FIG. 3 illustrates an example of such radio stripe system 800.

The method 200 starts at step 210 with obtaining channel estimates for channels to the at least two UEs 700. The obtained channel estimates may be CSI obtained from reference pilot signals transmitted by the at least two UEs 700 served by the radio stripe system 800. The method continues with step 220 of receiving effective precoded channels from at least one preceding first APU 300. The at least one preceding first APU 300 may be located closer to the CPU 600 than the second APU 400. In one embodiment, there may be one preceding first APU 300. In another embodiment, there may be multiple preceding first APUs 300.

Thereafter, the method continues with step 230 of determining a precoding filter based on the obtained channel estimates and the received effective precoded channels from said at least one preceding first APU 300. The precoding filter is going to be applied to signals that are to be transmitted from the second APU 400 to the at least two UEs 700 served by the radio stripe system 800. The precoding filter may be generated by a method selected from the group comprised of: MRT, ZF precoding and SLNR precoding. Alternatively, the precoding filter may be generated by some other method.

According to the method 200, each APU 300,400 makes a local decision based on its locally obtained channel estimates and fuses it with information received from previous APUs regarding how strong desired and interfering signal that these will jointly provide. When the second APU 400 receives input from at least one preceding first APU 300 that is closer to the CPU 600, along the same radio stripe, the second APU 400 may combine the received information with its own local information. This combined information will be used when transmitting payload data in the downlink. This will enable suppression of the interference that preceding APUs are causing. If it is assumed that the second APU 400 comprises M antennas, the second APU 400 may determine an M-dimensional precoding filter, but the processing will consider an M+1 antenna system. The additional dimension describes the joint effect of the precoding already applied at preceding APUs. After the processing, the second APU may inform the next, e.g. a third APU 500, about the combined effect of all the precoding that has been determined so far.

The proposed method 200 overcomes the drawbacks that existing solutions have, which are that the existing solutions either are distributed, but lacks interference suppression capability, or support interference suppression, but require a centralized implementation with heavy fronthaul traffic. With the proposed method 200, it is not necessary to gather all the channel estimates at the CPU 600 or some other central entity in the network. Instead, each APU will receive relevant information from preceding APUs and makes its decision based on this. The proposed method 200 may greatly increase the achievable rates, since cell-free networks typically operate at high Signal-to-Noise-Ratio (SNR) where the system performance is interference limited.

In some embodiments, the method 200 may further comprise the step 240 of receiving data signals from the CPU 600 and the step 250 of applying the determined precoding filter to the received data signals to generate a precoded signal. The method 200 may further comprise the step 260 of transmitting the precoded signal to the at least two UEs 700 served by the radio stripe system 800. Thus, with the proposed method 200, there will be no interference between the served UEs 700 as the second APU 400 will transmit signals that have been applied with the determined precoding filter which takes both local information and information received from at least one first APU 300 into account.

In some embodiments, the method 200 may further comprise the step 270 of determining effective precoded channels for the signals to the at least two UEs 700 based on the determined precoding filter and the obtained channel estimates. The effective precoded channels represent the effective channel created after the precoding filter being applied to each channel for the at least two UEs 700. The method 200 may further comprise the step 280 of transmitting the effective precoded channels to at least one subsequent third APU 500 located further from the CPU 600.

If it is assumed that the radio stripe system 800 serves K number of UEs 700, $K^2$ scalar coefficients will be transmitted to the at least one subsequent third APU 500. The $K^2$ scalar coefficients represent the effective K×K channel results after application of the precoding filter for each of the K served UEs 700. The number of variables that needs to be sent from the second APU 400 to the at least one subsequent third APU 500 may be independent of how many APUs there are on a radio stripe. If a sequence of data symbols should be transmitted in the same transmission block, the precoding may be the same for all of them. Thus, the $K^2$ effective desired and interfering scalar channels may be the same throughout the block. Accordingly, the proposed method is scalable and not dependent on how many APUs that are connected within the radio stripe system 800.

In some embodiments, each of the at least two APUs 300,400 in the radio stripe system 800 may be equipped with one antenna. In other embodiments, at least one of the at least two APUs 300,400 may have multiple antennas.

In some embodiments, only a subset of the APUs 300, 400,500 within the radio stripe system 800 may be transmitting to each UEs 700 and only this subset of APUs may determine precoding for this UE.

Figure 5:
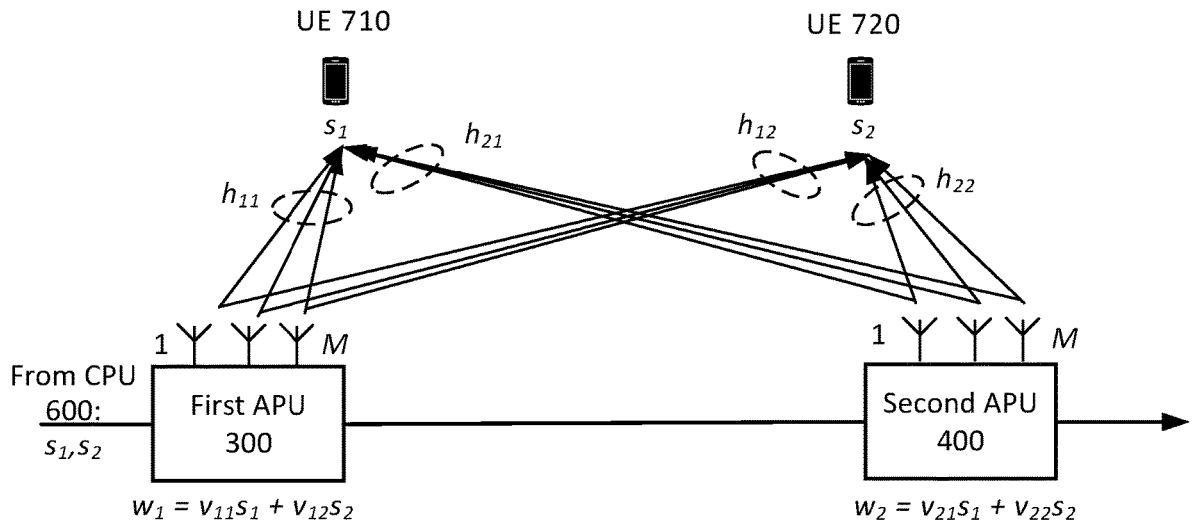
FIG. 5 illustrates an example arrangement comprising two M-antenna APUs and two single-antenna UEs.

The above proposed methods 100,200 are now going to be described together with a non-limiting example arrangement. The example arrangement is illustrated in FIG. 5. The arrangement in FIG. 5 comprises two M-antenna APUs, the first APU 300 and the second APU 400. The arrangement further comprises two single-antenna UEs, the first UE 710 and the second UE 720. The received signal at the first UE 710 is $$y_1 = h_{11}^H w_1 + h_{21}^H w_2 + n_1$$

where $h_{11}$ is the M-dimensional channel vector, i.e. the channel estimates, from the first APU 300 to the first UE 710 and $h_{12}$ is the M-dimensional channel vector from the second APU 400 to the first UE 710, while $n_1$ is the M-dimensional noise vector.

The first APU 300 selects its M-dimensional transmit signal $w_1$ such that it comprises the unit-power data signal $s_1$ intended for the first UE 710 and the unit-power data signal $s_2$ intended for the second UE 720. Power control will be achieved through scaling of the beamforming vectors. In this exemplary embodiment, linear precoding is used, where $$w_1 = v_{11} s_1 + v_{12} s_2$$

with $v_{11}$ being the M-dimensional precoding vector, or precoding filter, for the first UE 710 and $v_{12}$ the M-dimensional precoding vector, or filter, for the second UE 720. The first APU 300 may apply a local algorithm to select these vectors based on only its local channel estimates. Consequently, the received signals at the two UEs 710,720 will now be $$y_1 = h_{11}^H (v_{11} s_1 + v_{12} s_2) + h_1 w_2 + n_1 = g_{11}^1 s_1 + g_{12}^1 s_2 + h_{21}^H w_2 + n_1$$

$$y_2 = h_{12}^H (v_{11} s_1 + v_{12} s_2) + h_{22}^H w_2 + n_2 = g_{21}^1 z_1 + g_{22}^1 s_2 + h_{22}^H w_2 + n_2$$

where the notation $g_{ik}^1 = h_{1i}^H v_{1k}$ is introduced for i, k=1,2. The first APU 300 may send these $K^2=4$ scalar parameters to the subsequent second APU 400. The second APU 400 is further away from the CPU 600, but located on the same radio stripe, along the same fronthaul connection. In this example, it is assumed that the first APU 300 may have perfect knowledge of the channel vectors, but when that is not the case, the first APU 300 may use estimates instead.

The second APU 400 may also apply linear precoding with $$w_2 = v_{21}s_1 + v_{22}s_2$$

with $v_{21}$ being the M-dimensional precoding vector, or filter, for the first UE 7101 and $v_{22}$ is the M-dimensional precoding vector, or filter, for the second UE 720. The received signals at the two UEs 710,720 will now be $$y_1 = g_{11}^1 s_1 + g_{12}^1 s_2 + h_{21}^H(v_{21}s_1 + v_{22}s_2) + n_1 = (g_{11}^1 + h_{21}^H v_{21})s_1 + (g_{12}^1 + h_{21}^H v_{22})s_2 + n_1$$

$$y_2 = g_{21}s_1 + g_{22}^1 s_2 + h_{22}^H(v_{21}s_1 + v_{22}s_2) + n_2 = (g_{21}^1 + h_{22}^H v_{21})s_1 + (g_{22}^1 + h_{22}^H v_{22})s_2 + n_2$$

The second APU 400 may now select $v_{21}$ and $v_{22}$ while knowing the contribution that the first APU 300 have already made. For example, it may apply a local zero-forcing solution by selecting $v_{21}$ such that the interference term caused to the second UE 720 is $g_{21}^1 + h_{22}^H v_{21} = 0$. It may simultaneously select $v_{22}$ such that the interference term caused to the first UE 710 is $g_{12}^1 + h_{21}^H v_{22} = 0$. With this choice of $v_{21}$ and $v_{22}$, the received signals at the two UEs become $$y_1 = (g_{11}^1 + h_{21}^H v_{21})s_1 + n_1$$

$$y_2 = (g_{22}^1 + h_{22}^H v_{22})s_2 + n_2$$

and there is no interference between the two UEs 710,720. The zero-forcing conditions may be satisfied by selecting any preliminary vectors $\tilde{v}_{21}$ and $\tilde{v}_{22}$ (e.g., using maximum ratio transmission or some other method) and then setting $v_{21} = a_{21}\tilde{v}_{21}$ and $v_{22} = a_{22}\tilde{v}_{22}$ where $$a_{21} = -\frac{g_{21}^1}{h_{22}^H \tilde{v}_{21}} \text{ and } a_{22} = -\frac{g_{22}^1}{h_{21}^H \tilde{v}_{22}}.$$

When there are more than two APUs and two UEs along the radio stripe and/or strict power constraints, it might be undesirable or difficult to cancel all the interference at every APU. In that, case signal-to-interference-and-leakage ratio (SLNR) precoding or similar MMSE-like precoding methods can be used instead. In that case, the second APU 400 may select $v_{21}$ and $v_{22}$ to maximize $$\frac{|g_{11}^1 + h_{21}^H v_{21}|^2}{|g_{21}^1 + h_{22}^H v_{21}|^2 + \sigma^2} \text{ and } \frac{|g_{22}^1 + h_{22}^H v_{22}|^2}{|g_{12}^1 + h_{21}^H v_{22}|^2 + \sigma^2}$$

respectively, where $\sigma^2$ is the noise variance. In some embodiments the noise variance may be thermal noise, in some embodiments the noise variance may be an estimate of thermal noise plus interference level from other transmitters. This value may for example be derived from measurements on ZP CSI-RS assigned to the UEs.

According to a third aspect of the present disclosure, there is provided a first APU 300 for performing the method 100 according to the first aspect.

Figure 6:
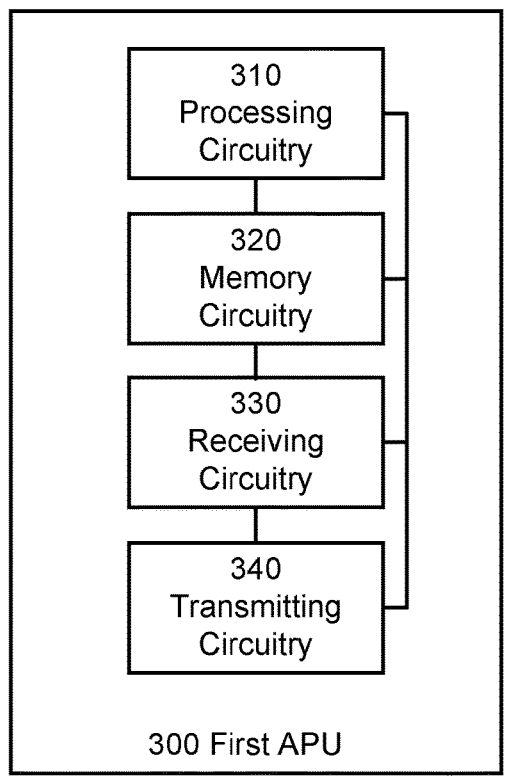
FIG. 6 shows an example implementation of a first APU.

The first APU 300 is now going to be described with reference to FIG. 6. The first APU 300 may be used in, but are not limited to, a radio stripe system 800 such as illustrated in FIG. 3.

The first APU 300 is configured for sequential transmit precoding in a radio stripe system 800. The radio stripe system 800 comprises at least two APUs 300,400 and a CPU 600. The at least two APUs 300,400 are connected in series to the CPU 600. The radio stripe system 800 serves at least two UEs 700. As illustrated in FIG. 6, the first APU 300 comprises a processing circuitry 310 and a memory circuitry 320.

Additionally, or alternatively, the first APU 300 may further comprise a transmitter, or a transmitting circuitry 340, configured to transmit data to other apparatuses, such as the at least one subsequent second APU 400. [0099]. Additionally, or alternatively, the first APU 300 may further comprise a receiver, or a receiving circuitry 330, configured to receive data from other apparatuses, such as the CPU 600 or at least one UE.

The memory circuitry 320 stores computer program code which, when run in the processing circuitry 310, causes the first APU 300 to obtain channel estimates for channels to the at least two UEs and to determine a precoding filter based on the obtained channel estimates. The obtained channel estimates may be CSI obtained from reference pilot signals transmitted by the at least two UEs 700 served by the radio stripe system 800. The precoding filter is going to be applied to signals that are to be transmitted from the first APU 300 to the at least two UEs 700. The precoding filter may be generated by a method selected from the group comprised of: MRT, ZF precoding and SLNR precoding. The first APU 300 is further caused to determine effective precoded channels for the signals to the at least two UEs 700 based on the determined precoding filter and the obtained channel estimates. The effective precoded channels represent the effective channel created after the precoding filter being applied to each channel for the at least two UEs. Thereafter, the first APU 300 is caused to transmit the effective precoded channels to at least one subsequent second APU 400. The at least one subsequent second APU 400 may be located further from the CPU 600 than the first APU 300 located further from the CPU 600.

In some embodiments, each of the at least two APUs 300,400 in the radio stripe system 800 may be equipped with one antenna.

In some embodiments, the radio stripe system 800 may have a tree structure and the first APU 300 is connected to two subsequent second APUs 400 located further away from the CPU 600. The effective precoded channels may be transmitted to both subsequent second APUs 400.

According to a fourth aspect, there is provided a second APU 400 for implementing the method according to the second aspect.

Figure 7:
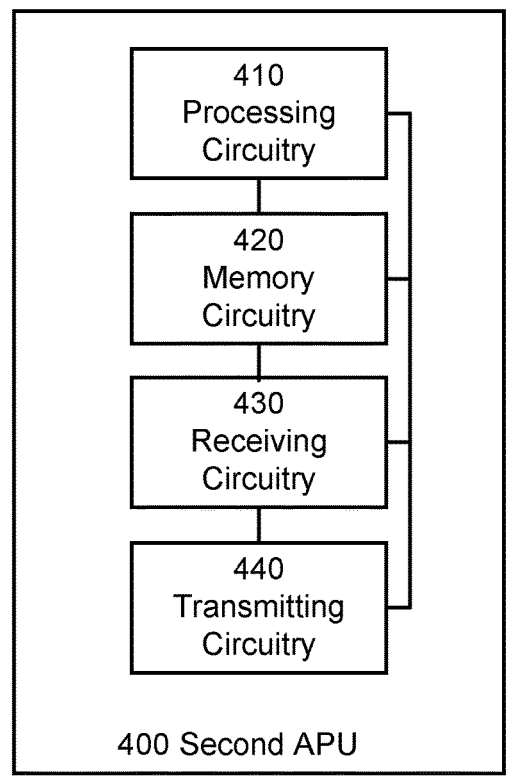
FIG. 7 shows an example implementation of a second APU.

The second APU 400 is now going to be described with reference to FIG. 7. The second APU 400 may be used in, but are not limited to, a radio stripe system 800 such as illustrated in FIG. 3.

The second APU 400 is configured for sequential transmit precoding in a radio stripe system 800. The radio stripe system 800 comprises at least two APUs 300,400 and a CPU 600, the at least two APUs 300,400 being connected in series to the CPU 600. The radio stripe system 800 serves at least two UEs 700. As illustrated in FIG. 7, the second APU 400 comprises a processor, or a processing circuitry 410, and a memory, or a memory circuitry 420.

Additionally, or alternatively, the second APU 400 may further comprise a transmitter, or a transmitting circuitry 440, configured to transmit data to other apparatuses, such as the at least one subsequent third APU 500.

Additionally, or alternatively, the second APU 400 may further comprise a receiver, or a receiving circuitry 430, configured to receive data from other apparatuses, such as the at least one preceding first APU 300.

The memory circuitry 420 storing computer program code which, when run in the processing circuitry 410, causes the second APU 400 to obtain channel estimates for channels to the at least two UEs 700. The obtained channel estimates may be CSI obtained from reference pilot signals transmitted by the served UEs 700. The second APU 400 is further caused to receive, from at least one preceding first APU 300, effective precoded channels. The at least one preceding first APU 300 may be located closer to the CPU 600 than the second APU 400. The memory circuitry 420 further stores computer program code which, when run in the processing circuitry 410, causes the second APU 400 to determine a precoding filter based on the obtained channel estimates and the received effective precoded channels from said at least one preceding first APU 300. The precoding filter is going to be applied to signals that are to be transmitted from the second APU 400 to the at least two UEs 700. The precoding filter may be generated by a method selected from the group comprised of: MRT, ZF precoding and SLNR precoding.

In some embodiments, the memory circuitry 420 storing computer program code which, when run in the processing circuitry 410, may further cause the second APU 400 to determine effective precoded channels for the signals to the at least two UEs 700 based on the determined precoding filter and the obtained channel estimates. The effective precoded channels represent the effective channel created after the precoding filter being applied to each channel for the at least two UEs. The second APU 400 may further be caused to transmit the effective precoded channels to at least one subsequent third APU 500 located further from the CPU 600.

In some embodiments, each of the at least two APUs 300,400 in the radio stripe system 800 may be equipped with one antenna. In other embodiments, at least one of the at least two APUs 300,400 may be equipped with multiple antennas.

According to a fifth aspect, there is provided a computer program comprising instructions which, when executed on a processing circuitry, cause the processing circuitry to carry out the method according to the first aspect and/or the second aspect.

According to a sixth aspect, there is provided a carrier containing the computer program of the fifth aspect, wherein the carrier is one of an electronic signal, optical signal, radio signal, or computer readable storage medium.

A Numerical Linear Processing Example

In the following, a non-limiting example of the proposed solution will now be described.

Figure 8:
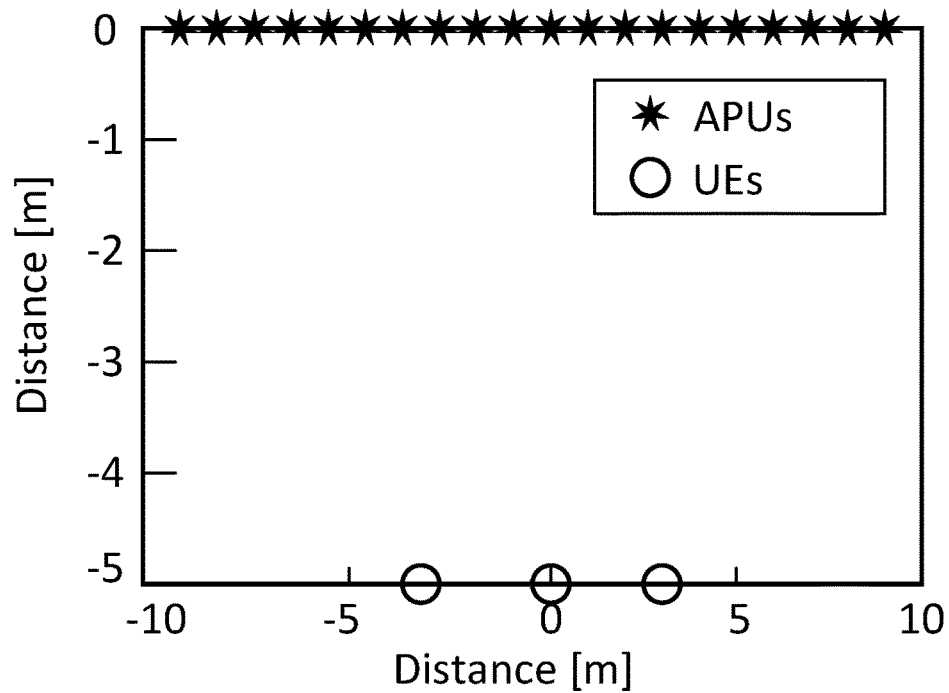
FIG. 8 shows one example embodiment of the proposed solution.

A radio stripe with 20 single-antenna equal-spaced APUs may be deployed on a 20-meter-long wall. There may be a fronthaul connection between each of the APUs. A CPU may be located at one of the ends of the stripe, the setup is symmetric so it could be at any of the ends. Three UEs may be located 5 meters from the wall and may be 3 or 6 meters from each other, as shown in FIG. 8. The propagation channels may be computed using free-space line-of-sight propagation modelling at a 3 GHz carrier frequency with no reflections. Each APU may have perfect knowledge of the channel from each of the UEs, but no channel state information is communicated to or from the other APUs.

In the following, the proposed solution is compared with two baseline methods during downlink data transmission. These two baseline methods are known in the art and are:
  Distributed Maximum Ratio Transmission (MRT), where each APU may compute its transmitted signal solely based on the payload data symbols and local channel state information. Each APU may allocate an equal share of its power for each UE.
  Centralized precoding optimization, where each APU may send all its estimates to the CPU, which may optimize the precoding under the constraint that each APU divides its power equally among the users. The optimization criterion may be to maximize the max-min rate, which is solved using a sequence of convex optimization problems.

These baseline methods may be compared with the proposed solution, wherein in this example each APU may use local SLNR precoding. The proposed solution is here referred to as "sequential SLNR" or "seq-SLNR.

Figure 9:
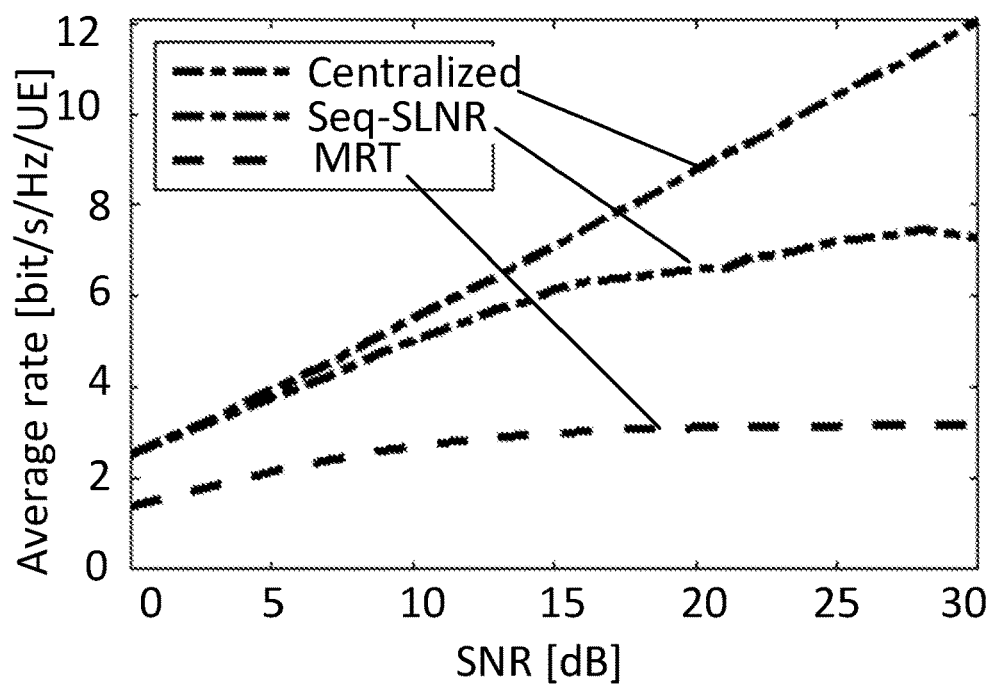
FIG. 9 illustrates the achievable rates with the proposed solution compared to two known methods.

FIG. 9 shows the achievable rates with the proposed solution and the two previously described known methods, as a function of the average downlink SNR. As seen in FIG. 9, the performance with the distributed MRT method saturates at high SNR, due to its lack of interference suppression capabilities. In contrast, the centralized method provides an achievable rate that grows linearly with the SNR in dB-scale, as expected from a method that provides interference suppression and has access to high-quality CSI. Note that in this short-range scenario, an SNR of 20-30 dB is achieved even when the transmit power is very low.

The proposed solution combines the benefits of the two baseline methods. The proposed solution has a distributed implementation but provides a rate comparable to that of the centralized method, up to a rate of 6 bit/s/Hz. With a fine-tuned local precoding selection, the rate can increase linearly with the SNR in dB-scale.

Figure 10:
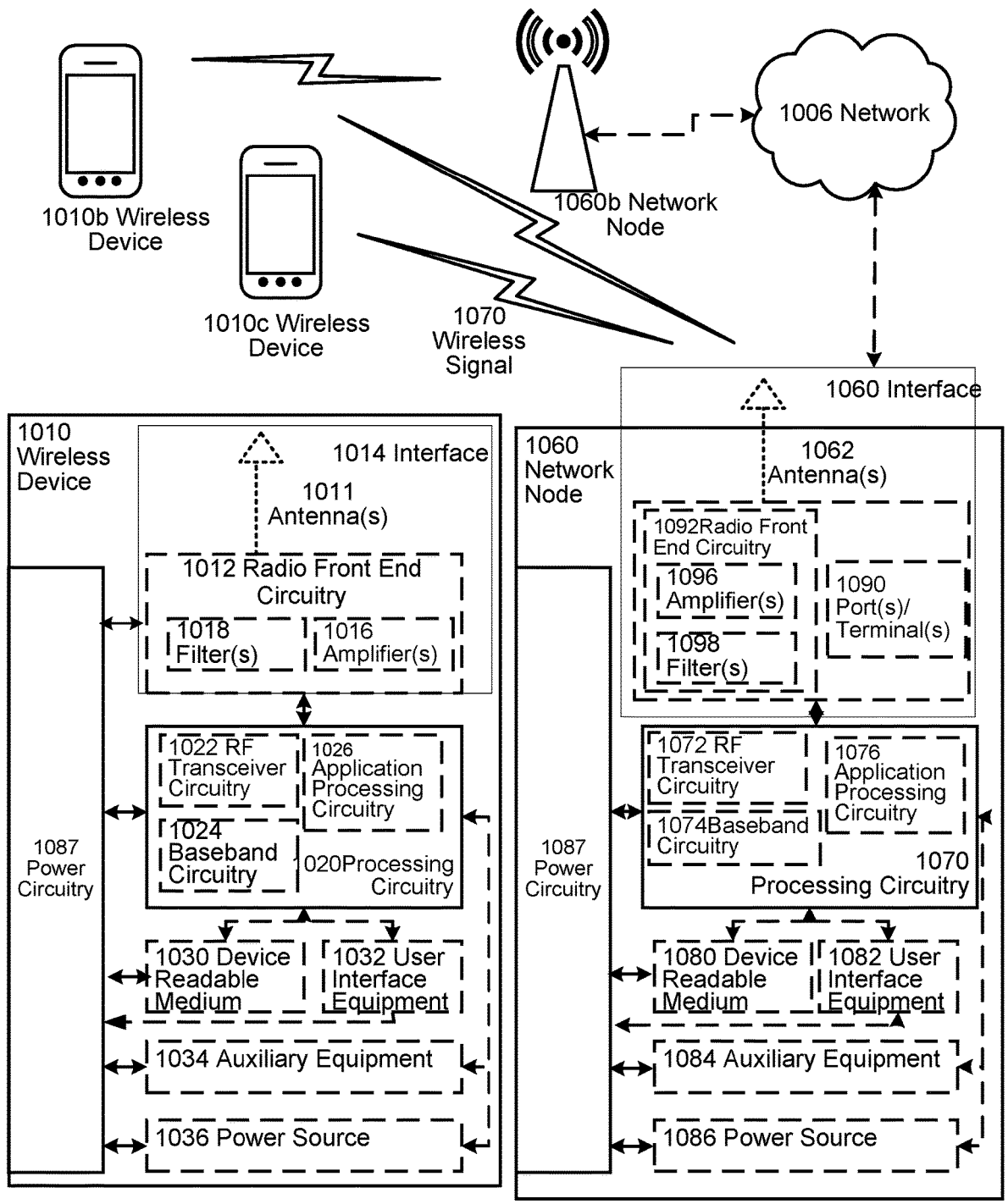
FIG. 10 illustrates an example wireless network.

Although the subject matter described herein may be implemented in any appropriate type of system using any suitable components, the embodiments described herein relate to a wireless network, such as the example wireless communication network illustrated in FIG. 10. For simplicity, the wireless communication network of FIG. 10 only depicts network 1006, network nodes 1060 and 1060b, and Wireless Devices (WDs) 1010, 1010b, and 1010c. The wireless communication network may further include any additional elements suitable to support communication between wireless devices or between a wireless device and another communication device, such as a landline telephone. Of the illustrated components, network node 1060 and wireless device (WD) 1010 are depicted with additional detail. The illustrated wireless communication network may provide communication and other types of services to one or more wireless devices to facilitate the wireless devices' access to and/or use of the services provided by the wireless communication network.

The wireless communication network may comprise and/or interface with any type of communication, telecommunication, data, cellular, and/or radio network or other similar type of system. In some embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless communication network to enable and/or provide wireless access to the wireless device and/or to perform other functions (e.g., administration) in the wireless communication network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, network node 1060 may be a virtual network node as described in more detail below. More generally, however, network nodes may represent any suitable device (or group of devices) capable, configured, arranged, and/or operable to enable and/or provide a wireless device with access to the wireless communication network or to provide some service to a wireless device that has accessed the wireless communication network.

In FIG. 10, Network node 1060 includes processing circuitry 1070, device readable medium 1080, interface 1090, user interface equipment 1082, auxiliary equipment 1084, power source 1086, power circuitry 1087, and antenna 1062. Although network node 1060 illustrated in the example wireless communication network of FIG. 10 may represent a device that includes the illustrated combination of hardware components, other embodiments may comprise network nodes with different combinations of components.

It is to be understood that a network node may comprise any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units.

In certain embodiments, some or all of the functionality described herein as being provided by a network node, base station, eNB or other such network device may be provided by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 10100 may be considered to be integrated.

Interface 1090 is used in the wired or wireless communication of signaling and/or data between network node 1060, network 1006, and/or WDs 1010. As illustrated, interface 1090 comprises port(s)/terminals(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1013 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1013 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
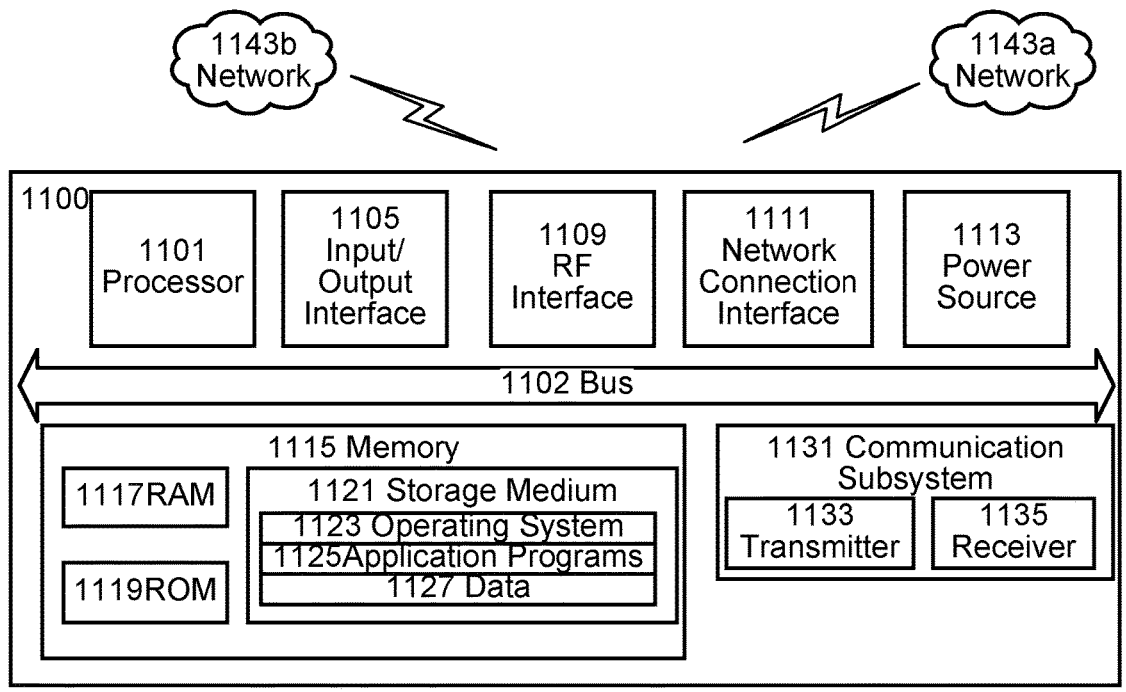
FIG. 11 shows a user equipment according to an embodiment.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1114, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1114 may be configured to provide computer instructions or data to processing circuitry 1101. For example, ROM 1114 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.9, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power 5 source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
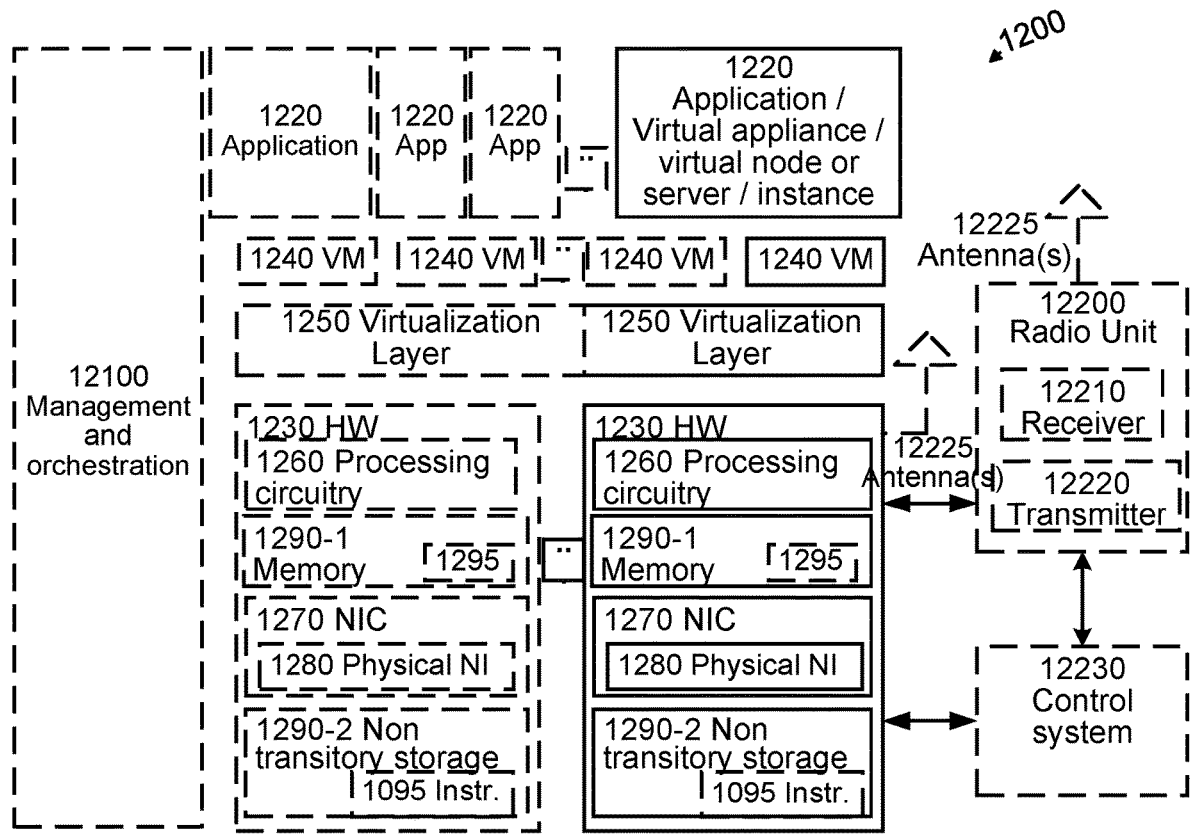
FIG. 12 shows a virtualization environment according to an embodiment.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analogue hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE))

where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signaling can be affected with the use of control system 12230 which may alternatively be used for communication between the hardware nodes 1230 and radio units 12200.

Figure 13:
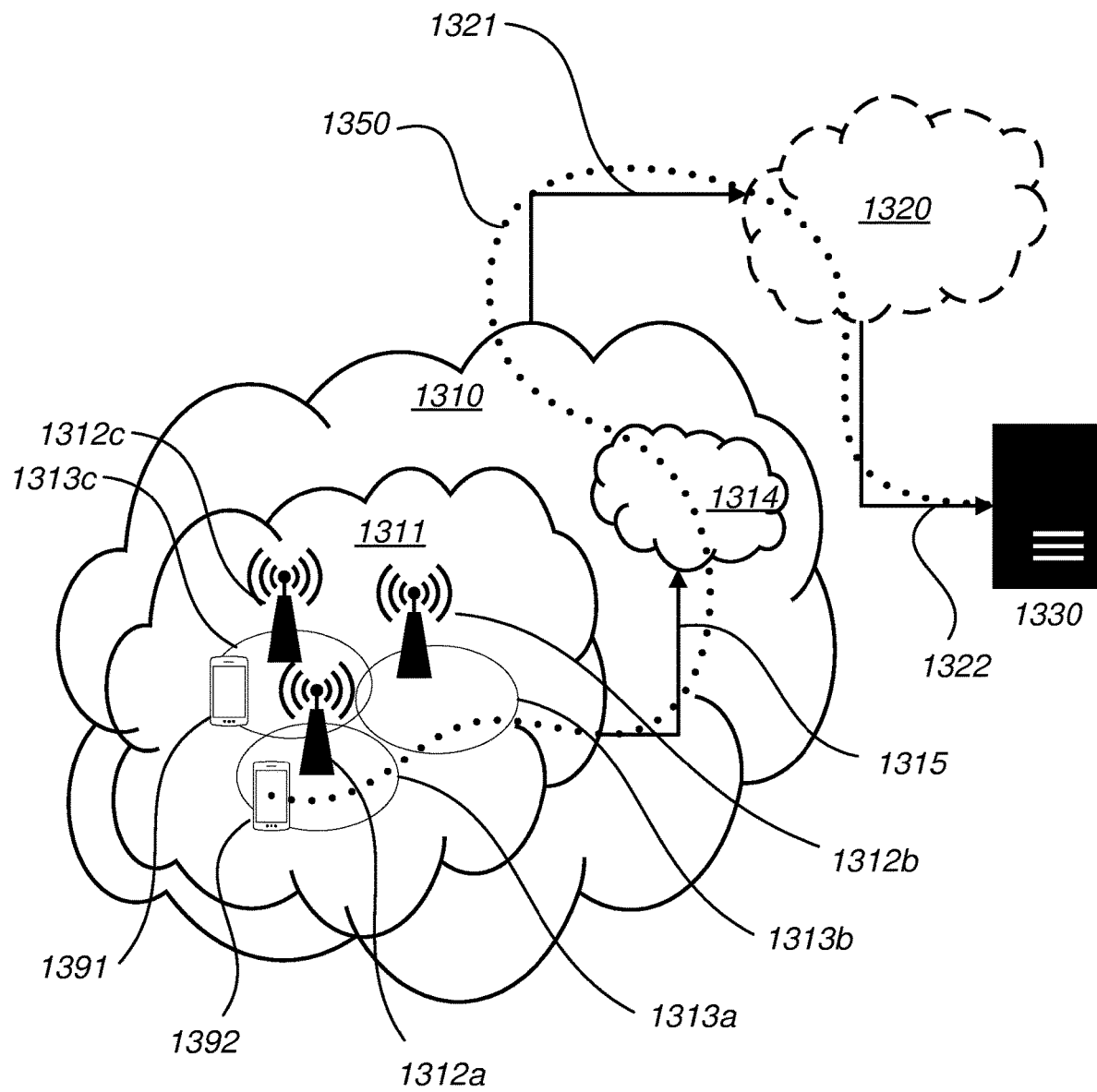
FIG. 13 illustrates an example telecommunication network connected via an intermediate network to a host computer.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1316 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct, or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

Figure 14:
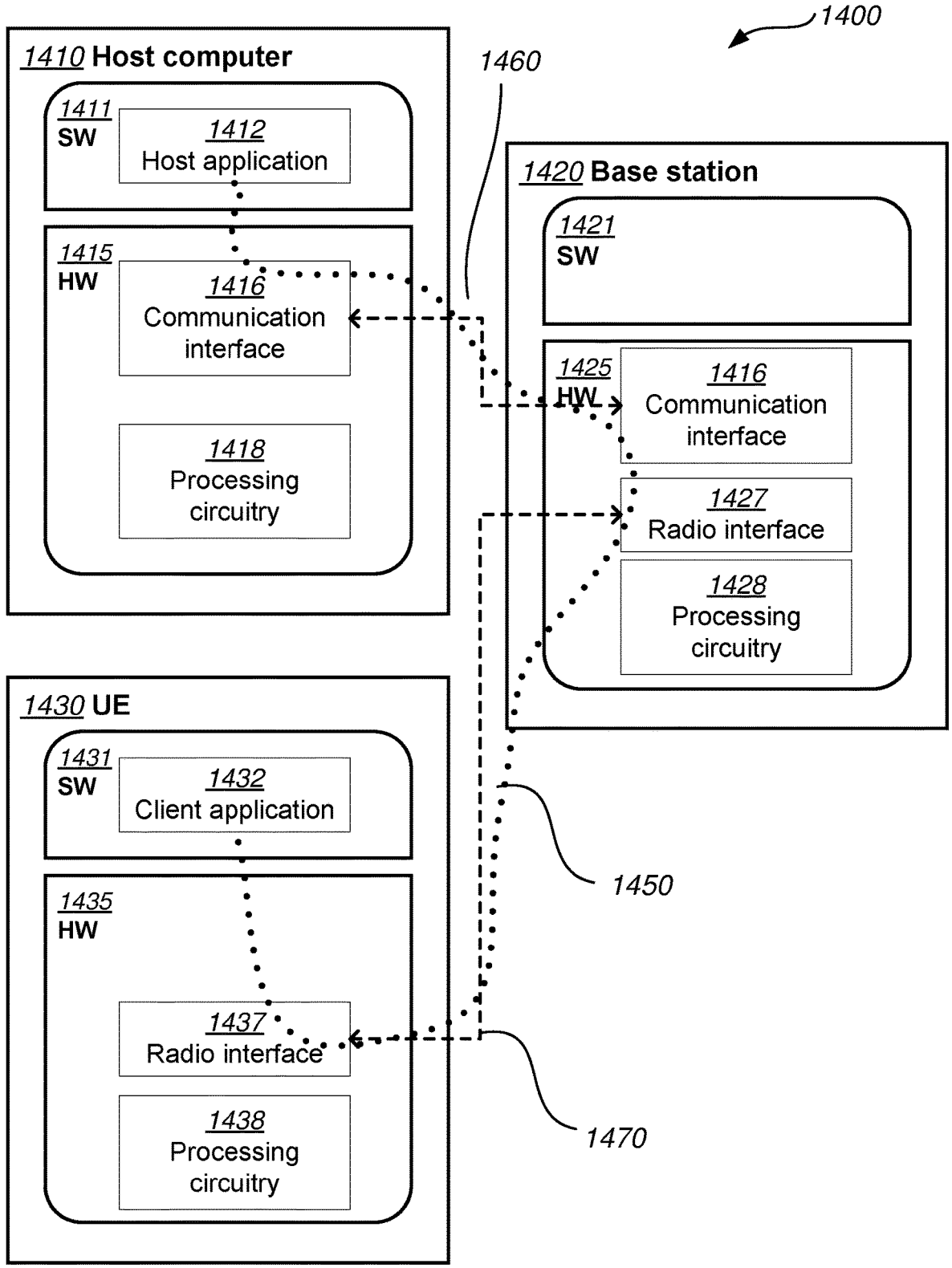
FIG. 14 shows a host computer communicating via a base station with a user equipment over a partially wireless connection according to an embodiment.

It is noted that host computer 1410, base station 1420 and UE 1430 illustrated in FIG. 14 may be similar or identical to host computer 1430, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the data rate and thereby provide benefits such as better responsiveness.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figures 15, 16:
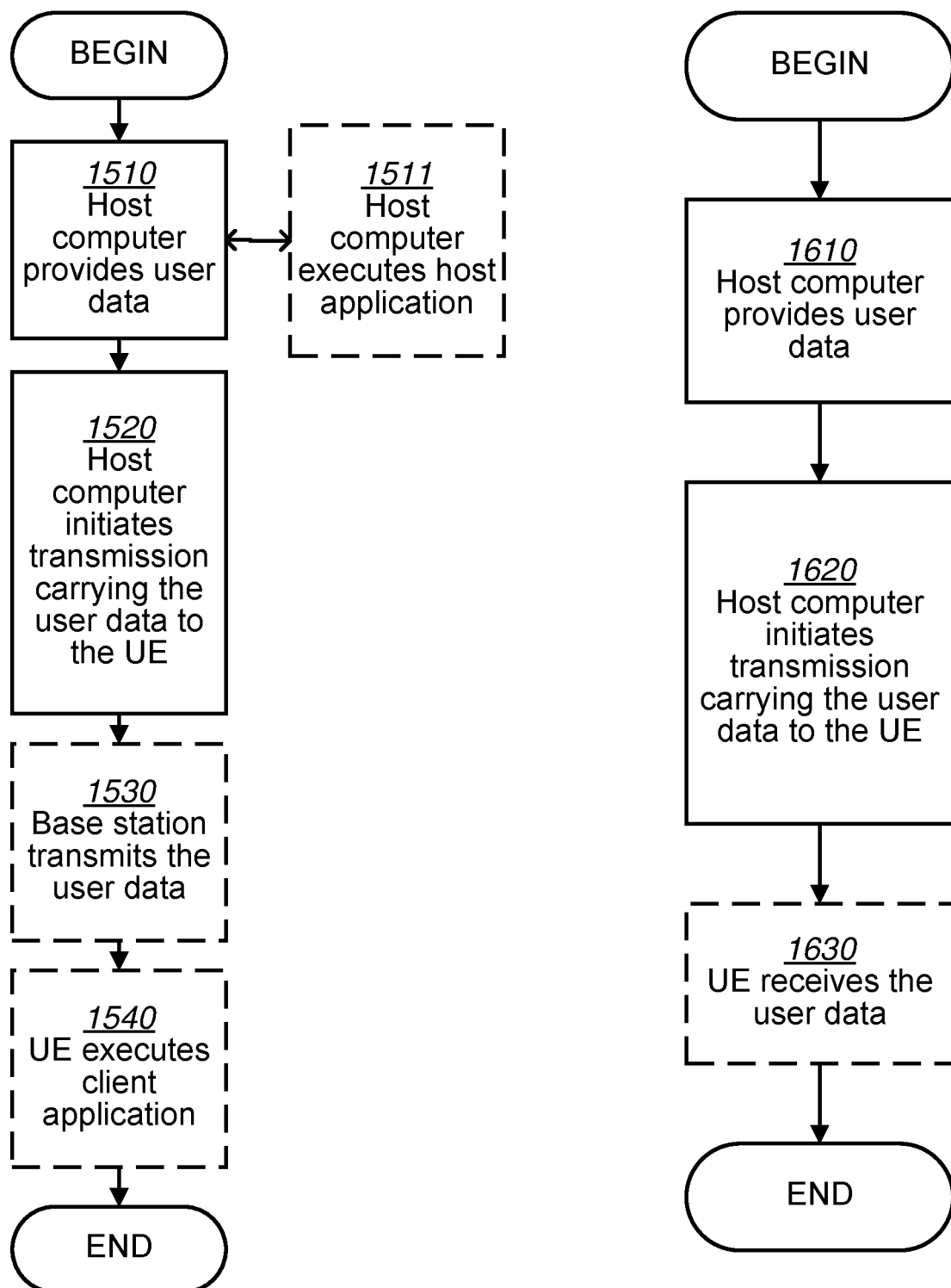
FIG. 15 shows an example method implemented in a communication system including a host computer, a base station and a user equipment.
FIG. 16 illustrates an example method implemented in a communication system including a host computer, a base station and a user equipment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
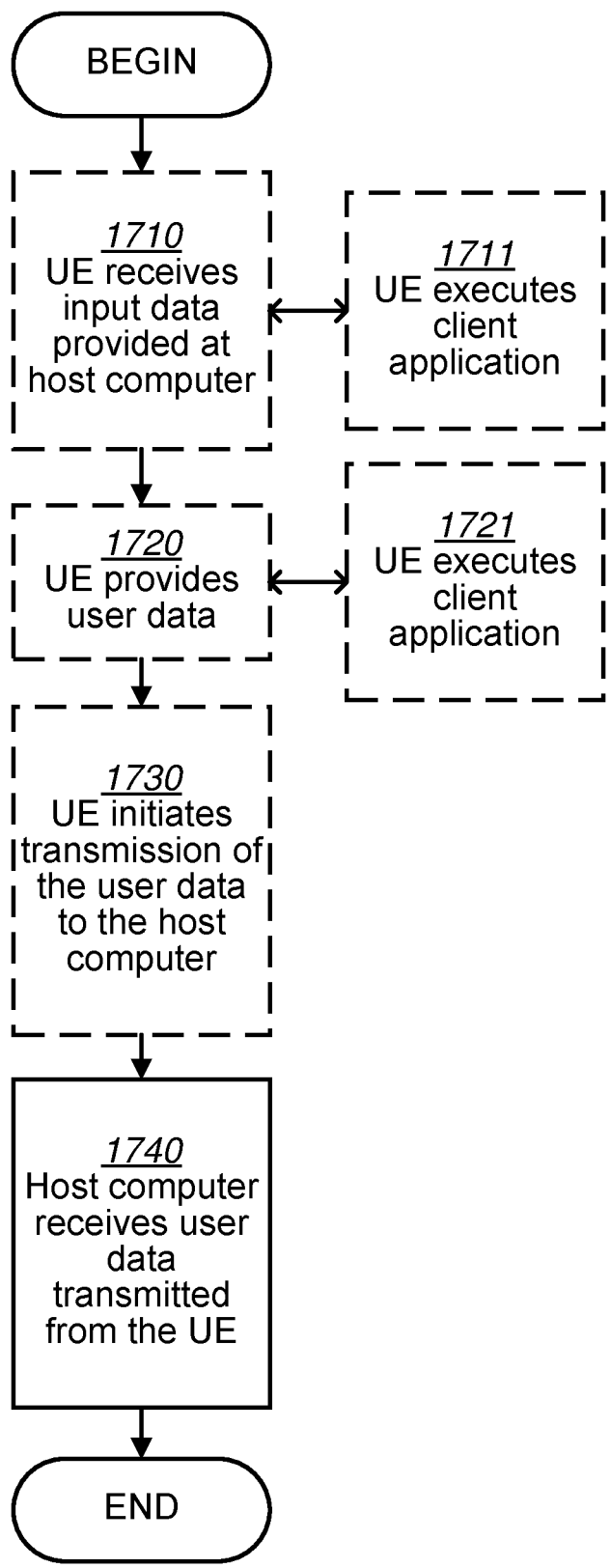
FIGS. 17 and 18 show example methods implemented in a communication system including a host computer, a base station and a user equipment.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional)

of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
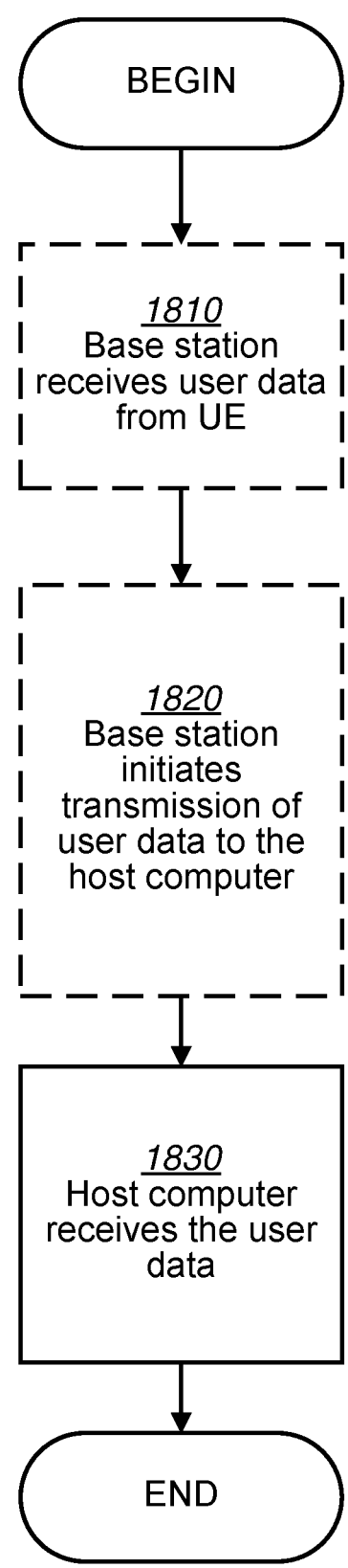

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read-Only Memory (ROM), Random-Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Numbered embodiments in particular related to FIGS. 10-18

1. A first APU configured to communicate with a User Equipment (UE), the first APU comprising a radio interface and processing circuitry configured to:
   obtain channel estimates for channels to the at least two UEs;
   determine a precoding filter based on the obtained channel estimates, wherein the precoding filter is going to be applied to signals that are to be transmitted from the first APU to the at least two UEs;
   determine effective precoded channels for the signals to the at least two UEs based on the determined precoding filter and the obtained channel estimates, wherein the effective precoded channels represent the effective channel created after the precoding filter being applied to each channel for the at least two UEs; and
   transmit the effective precoded channels to at least one subsequent second APU located further from the CPU.
2. The first APU according to embodiment 1, wherein the first APU further is configured to:
   receive data signals from the CPU;
   apply the determined precoding filter to the received data signals to generate a precoded signal; and
   transmit the precoded signal to the at least two UEs served by the radio stripe system.
3. The first APU according to any of embodiment 1 and 2, wherein the obtained channel estimates are Channel State Information, CSI, obtained from reference pilot signals transmitted by the at least two UEs served by the radio stripe system.
4. The first APU according to any of embodiments 1 to 3, wherein the precoding filter is generated by a method selected from the group comprised of: maximum-ratio transmission (MRT), zero-forcing (ZF) precoding and signal-to-interference-and-leakage ratio (SLNR) precoding.
5. The first APU according to any of embodiments 1 to 4, wherein each of the at least two APUs in the radio stripe system is equipped with one antenna.
6. The first APU according to any of embodiments 1 to 5, wherein the at least one subsequent second APU is located further from the CPU than the first APU.
7. The first APU according to any of embodiments 1 to 6, wherein the radio stripe system have a tree structure and the first APU (300) is connected to two subsequent second APUs (400) located further away from the CPU (600) and wherein the effective precoded channels are transmitted to both subsequent second APUs.
8. A communication system including a host computer comprising:
   processing circuitry configured to provide user data; and
   a communication interface configured to forward the user data to a cellular network for transmission to a User Equipment (UE), wherein the cellular network comprises a first APU having a radio interface and processing circuitry, the first APU's processing circuitry configured to obtain channel estimates for channels to the at least two UEs; determine a precoding filter based on the obtained channel estimates, wherein the precoding filter is going to be applied to signals that are to be transmitted from the first APU to the at least two UEs; determine effective precoded channels for the signals to the at least two UEs based on the determined precoding filter and the obtained channel estimates, wherein the effective precoded channels represent the effective channel created after the precoding filter being applied to each channel for the at least two UEs; and transmit the effective precoded channels to at least one subsequent second APU located further from the CPU.
9. The communication system of embodiment 8, further including the first APU.

10. The communication system of embodiment 9, further including the UE, wherein the UE is configured to communicate with the first APU.

11. The communication system of embodiment 10, wherein:
the processing circuitry of the host computer is configured to execute a host application, thereby providing the user data; and the UE comprises processing circuitry configured to execute a client application associated with the host application.

12. A method implemented in a first APU, comprising
obtaining channel estimates for channels to the at least two UEs;
determining a precoding filter based on the obtained channel estimates, wherein the precoding filter is going to be applied to signals that are to be transmitted from the first APU to the at least two UEs;
determining effective precoded channels for the signals to the at least two UEs based on the determined precoding filter and the obtained channel estimates, wherein the effective precoded channels represent the effective channel created after the precoding filter being applied to each channel for the at least two UEs; and
transmitting the effective precoded channels to at least one subsequent second APU.

13. A method implemented in a communication system including a host computer, a first APU and a User Equipment (UE), the method comprising:
at the host computer, providing user data; and at the host computer, initiating a transmission carrying the user data to the UE via a cellular network comprising the first APU, wherein the first APU
obtaining channel estimates for channels to the at least two UEs;
determining a precoding filter based on the obtained channel estimates, wherein the precoding filter is going to be applied to signals that are to be transmitted from the first APU to the at least two UEs;
determining effective precoded channels for the signals to the at least two UEs based on the determined precoding filter and the obtained channel estimates, wherein the effective precoded channels represent the effective channel created after the precoding filter being applied to each channel for the at least two UEs; and transmitting the effective precoded channels to at least one subsequent second APU.

14. The method of embodiment 13, further comprising:
at the first APU, transmitting the user data.

15. The method of embodiment 14, wherein the user data is provided at the host computer by executing a host application, the method further comprising:
at the UE, executing a client application associated with the host application.

16. A User Equipment (UE) configured to communicate with a first APU, the UE comprising a radio interface and processing circuitry configured to transmit and receive data to and from the first APU.

17. A communication system including a host computer comprising:
processing circuitry configured to provide user data; and
a communication interface configured to forward user data to a cellular network for transmission to a User Equipment (UE),
wherein the UE comprises a radio interface and processing circuitry, the UE's processing circuitry configured to transmit and receive data to and from a first APU.

18. The communication system of embodiment 17, further including the UE.

19. The communication system of embodiment 17, wherein the cellular network further includes a first APU configured to communicate with the UE.

20. The communication system of embodiment 18 or 19, wherein:
the processing circuitry of the host computer is configured to execute a host application, thereby providing the user data; and
the UE's processing circuitry is configured to execute a client application associated with the host application.

21. A method implemented in a communication system including a host computer, a first APU and a User Equipment (UE), the method comprising:
at the host computer, providing user data; and
at the host computer, initiating a transmission carrying the user data to the UE via a cellular network comprising the first APU, wherein the UE transmits and receives to and from the first APU.

22. The method of embodiment 21, further comprising:
at the UE, receiving the user data from the first APU.

23. A communication system including a host computer comprising:
a communication interface configured to receive user data originating from a transmission from a User Equipment (UE) to a first APU,
wherein the UE comprises a radio interface and processing circuitry, the UE's processing circuitry configured to transmit and receive data to and from the first APU.

24. The communication system of embodiment 23, further including the UE.

25. The communication system of embodiment 24, further including the first APU, wherein the first APU comprises a radio interface configured to communicate with the UE and a communication interface configured to forward to the host computer the user data carried by a transmission from the UE to the first APU.

26. The communication system of embodiment 24 or 25, wherein:
the processing circuitry of the host computer is configured to execute a host application; and the UE's processing circuitry is configured to execute a client application associated with the host application, thereby providing the user data.

27. The communication system of embodiment 24 or 25, wherein:
the processing circuitry of the host computer is configured to execute a host application, thereby providing request data; and
the UE's processing circuitry is configured to execute a client application associated with the host application, thereby providing the user data in response to the request data.

28. A method implemented in a User Equipment (UE), comprising transmitting and receiving data to and from a first APU.

29. The method of embodiment 28, further comprising:
providing user data; and
forwarding the user data to a host computer via the transmission to the first APU.

30. A method implemented in a communication system including a host computer, a first APU and a User Equipment (UE), the method comprising:
   at the host computer, receiving user data transmitted to the first APU from the UE, wherein the UE transmitting and receiving data to and from the first APU.
31. The method of embodiment 30, further comprising:
   at the UE, providing the user data to the first APU.
32. The method of embodiment 31, further comprising:
   at the UE, executing a client application, thereby providing the user data to be transmitted; and
   at the host computer, executing a host application associated with the client application.
33. The method of embodiment 32, further comprising:
   at the UE, executing a client application; and
   at the UE, receiving input data to the client application, the input data being provided at the host computer by executing a host application associated with the client application, wherein the user data to be transmitted is provided by the client application in response to the input data.
34. A communication system including a host computer comprising a communication interface configured to receive user data originating from a transmission from a User Equipment (UE) to a first APU, wherein the first APU comprises a radio interface and processing circuitry, the first APU's processing circuitry configured to obtain channel estimates for channels to the at least two UEs; determine a precoding filter based on the obtained channel estimates, wherein the precoding filter is going to be applied to signals that are to be transmitted from the first APU to the at least two UEs; determine effective precoded channels for the signals to the at least two UEs based on the determined precoding filter and the obtained channel estimates, wherein the effective precoded channels represent the effective channel created after the precoding filter being applied to each channel for the at least two UEs; and transmit the effective precoded channels to at least one subsequent second APU located further from the CPU.
35. The communication system of embodiment 34, further including the first APU.
36. The communication system of embodiment 35, further including the UE, wherein the UE is configured to communicate with the first APU.
37. The communication system of embodiment 36, wherein:
   the processing circuitry of the host computer is configured to execute a host application;
   the UE is configured to execute a client application associated with the host application,
   thereby providing the user data to be received by the host computer.
38. A method implemented in a communication system including a host computer, a first APU and a User Equipment (UE), the method comprising:
   at the host computer, receiving, from the first APU, user data originating from a transmission which the first APU has received from the UE, wherein the UE transmits and receives data to and from the first APU.
39. The method of embodiment 38, further comprising:
   at the first APU, receiving the user data from the UE.
40. The method of embodiment 39, further comprising:
   at the first APU, initiating a transmission of the received user data to the host computer.
41. A second APU configured to communicate with a User Equipment (UE), the second APU comprising a radio interface and processing circuitry configured to:
   obtain channel estimates for the channels to the at least two UEs;
   receive effective precoded channels from at least one preceding first APU; and
   determine a precoding filter based on the obtained channel estimates and the received effective precoded channels from said at least one preceding first APU, wherein the precoding filter is going to be applied to signals that are to be transmitted from the second APU to the at least two UEs.
42. The second APU according to embodiment 41, wherein the second APU further is configured to:
   receive data signals from the CPU;
   apply the determined precoding filter to the received data signals to generate a precoded signal; and
   transmit the precoded signal to the at least two UEs served by the radio stripe system.
43. The second APU according to any of embodiment 41 and 42, wherein the second APU further is configured to:
   determine effective precoded channels for the signals to the at least two UEs based on the determined precoding filter and the obtained channel estimates, wherein the effective precoded channels represent the effective channel created after the precoding filter being applied to each channel for the at least two UEs; and
   transmit the effective precoded channels to at least one subsequent third APU located further from the CPU.
44. The second APU according to embodiment 43, wherein the obtained channel estimates are Channel State Information, CSI, obtained from reference pilot signals transmitted by the at least two UEs served by the radio stripe system.
45. The second APU according to embodiments 44, wherein the precoding filter is generated by a method selected from the group comprised of: maximum-ratio transmission (MRT), zero-forcing (ZF) precoding and signal-to-interference-and-leakage ratio (SLNR) precoding.
46. The second APU according to any of embodiments 42 to 45, wherein the at least one preceding first APU is located closer the CPU than the second APU.
47. The second APU according to any of embodiments 42 to 46, wherein each of the at least two APUs in the radio stripe system is equipped with one antenna.
48. A communication system including a host computer comprising:
   processing circuitry configured to provide user data; and
   a communication interface configured to forward the user data to a cellular network for transmission to a User Equipment (UE), wherein the cellular network comprises a second APU having a radio interface and processing circuitry, the second APU's processing circuitry configured to receive user data originating from a transmission from a User Equipment (UE) to a first APU, wherein the first APU comprises a radio interface and processing circuitry, the first APU's processing circuitry configured to obtain channel estimates for channels to the at least two UEs; determine a precoding filter based on the obtained channel estimates, wherein the precoding filter is going to be applied to signals that are to be transmitted from the first APU to the at least two UEs; determine effective precoded channels for the signals to the at least two UEs based on the determined precoding filter and the obtained channel estimates, wherein the effective precoded channels represent the effective channel created after the precoding filter being applied to each channel for the at least two UEs; and transmit the effective precoded channels to at least one subsequent second APU located further from the CPU.

49. The communication system of embodiment 47, further including the second APU.

50. The communication system of embodiment 49, further including the UE, wherein the UE is configured to communicate with the second APU.

51. The communication system of embodiment 50, wherein:
the processing circuitry of the host computer is configured to execute a host application, thereby providing the user data; and the UE comprises processing circuitry configured to execute a client application associated with the host application.

52. A method implemented in a second APU, comprising
obtaining channel estimates for channels to the at least two UEs;
receiving effective precoded channels from at least one preceding first APU; and
determining a precoding filter based on the obtained channel estimates and the received effective precoded channels from said at least one preceding first APU, wherein the precoding filter is going to be applied to signals that are to be transmitted from the second APU to the at least two UEs.

53. A method implemented in a communication system including a host computer, a second APU and a User Equipment (UE), the method comprising:
at the host computer, providing user data; and at the host computer, initiating a transmission carrying the user data to the UE via a cellular network comprising the second APU, wherein the second APU
obtaining channel estimates for channels to the at least two UEs;
receiving effective precoded channels from at least one preceding first APU; and
determining a precoding filter based on the obtained channel estimates and the received effective precoded channels from said at least one preceding first APU, wherein the precoding filter is going to be applied to signals that are to be transmitted from the second APU to the at least two UEs.

54. The method of embodiment 53, further comprising:
at the second APU, transmitting the user data.

55. The method of embodiment 54, wherein the user data is provided at the host computer by executing a host application, the method further comprising:
at the UE, executing a client application associated with the host application.

56. A User Equipment (UE) configured to communicate with a second APU, the UE comprising a radio interface and processing circuitry configured to transmit and receive data to and from the second APU.

57. A communication system including a host computer comprising:
processing circuitry configured to provide user data; and
a communication interface configured to forward user data to a cellular network for transmission to a User Equipment (UE),
wherein the UE comprises a radio interface and processing circuitry, the UE's processing circuitry configured to transmit and receive data to and from a second APU.

58. The communication system of embodiment 57, further including the UE.

59. The communication system of embodiment 57, wherein the cellular network further includes a second APU configured to communicate with the UE.

60. The communication system of embodiment 58 or 59, wherein:
the processing circuitry of the host computer is configured to execute a host application, thereby providing the user data; and
the UE's processing circuitry is configured to execute a client application associated with the host application.

61. A method implemented in a communication system including a host computer, a second APU and a User Equipment (UE), the method comprising:
at the host computer, providing user data; and
at the host computer, initiating a transmission carrying the user data to the UE via a cellular network comprising second APU, wherein the UE transmits and receives to and from the second APU.

62. The method of embodiment 61, further comprising:
at the UE, receiving the user data from the second APU.

63. A communication system including a host computer comprising:
a communication interface configured to receive user data originating from a transmission from a User Equipment (UE) to a second APU, wherein the UE comprises a radio interface and processing circuitry, the UE's processing circuitry configured to transmit and receive data to and from the second APU.

64. The communication system of embodiment 63, further including the UE.

65. The communication system of embodiment 64, further including the second APU, wherein the second APU comprises a radio interface configured to communicate with the UE and a communication interface configured to forward to the host computer the user data carried by a transmission from the UE to the second APU.

66. The communication system of embodiment 64 or 65, wherein:
the processing circuitry of the host computer is configured to execute a host application; and the UE's processing circuitry is configured to execute a client application associated with the host application, thereby providing the user data.

67. The communication system of embodiment 64 or 65, wherein:
the processing circuitry of the host computer is configured to execute a host application, thereby providing request data; and
the UE's processing circuitry is configured to execute a client application associated with the host application, thereby providing the user data in response to the request data.

68. A method implemented in a User Equipment (UE), comprising transmitting and receiving data to and from a second APU.

69. The method of embodiment 68, further comprising:
providing user data; and forwarding the user data to a host computer via the transmission to the second APU.

70. A method implemented in a communication system including a host computer, a second APU and a User Equipment (UE), the method comprising:
at the host computer, receiving user data transmitted to the second APU from the UE, wherein the UE transmitting and receiving data to and from the second APU.

71. The method of embodiment 70, further comprising:
at the UE, providing the user data to the second APU.

72. The method of embodiment 71, further comprising:
at the UE, executing a client application, thereby providing the user data to be transmitted; and
at the host computer, executing a host application associated with the client application.

73. The method of embodiment 72, further comprising:
at the UE, executing a client application; and
at the UE, receiving input data to the client application, the input data being provided at the host computer by executing a host application associated with the client application,
wherein the user data to be transmitted is provided by the client application in response to the input data.

74. A communication system including a host computer comprising a communication interface configured to receive user data originating from a transmission from a User Equipment (UE) to a second APU, wherein the second APU comprises a radio interface and processing circuitry, the second APU's processing circuitry configured to obtain channel estimates for the channels to the at least two UEs; receive effective precoded channels from at least one preceding first APU (300); and determine a precoding filter based on the obtained channel estimates and the received effective precoded channels from said at least one preceding first APU (300), wherein the precoding filter is going to be applied to signals that are to be transmitted from the second APU (400) to the at least two UEs.

75. The communication system of embodiment 74, further including the second APU.

76. The communication system of embodiment 75, further including the UE, wherein the UE is configured to communicate with the second APU.

77. The communication system of embodiment 76, wherein:
the processing circuitry of the host computer is configured to execute a host application; the UE is configured to execute a client application associated with the host application, thereby providing the user data to be received by the host computer.

78. A method implemented in a communication system including a host computer, a second APU and a User Equipment (UE), the method comprising:
at the host computer, receiving, from the second APU, user data originating from a transmission which the second APU has received from the UE, wherein the UE transmits and receives data to and from the second APU.

79. The method of embodiment 78, further comprising:
at the second APU, receiving the user data from the UE.

80. The method of embodiment 79, further comprising:
at the second APU, initiating a transmission of the received user data to the host computer.

The invention claimed is:
1. A method, performed by a first Antenna Processing Unit (APU) for sequential transmit precoding in a radio stripe system, wherein the radio stripe system comprises at least two APUs and a Central Processing Unit (CPU), the at least two APUs being connected in series from the CPU, wherein the radio stripe system serves at least two User Equipment (UEs) the method comprising:
obtaining channel estimates for channels to the at least two UEs;
determining a precoding filter based on the obtained channel estimates, wherein the precoding filter is going to be applied to signals that are to be transmitted from the first APU to the at least two UEs;
determining effective precoded channels for the signals to the at least two UEs based on the determined precoding filter and the obtained channel estimates, wherein the effective precoded channels represent the effective channel created after the precoding filter being applied to each channel for the at least two UEs; and
transmitting the effective precoded channels to at least one subsequent second APU.

2. The method according to claim 1, wherein the method further comprises:
receiving data signals from the CPU;
applying the determined precoding filter to the received data signals to generate a precoded signal; and
transmitting the precoded signal to the at least two UEs served by the radio stripe system.

3. The method according to claim 1, wherein the obtained channel estimates are Channel State Information (CSI) obtained from reference pilot signals transmitted by the at least two UEs served by the radio stripe system.

4. The method according to claim 1, wherein the precoding filter is generated by a method selected from the group comprised of: maximum-ratio transmission (MRT) zero-forcing (ZF) precoding and signal-to-interference-and-leakage ratio (SLNR) precoding.

5. The method according to claim 1, wherein each of the at least two APUs in the radio stripe system is equipped with one antenna.

6. The method according to claim 1, wherein the at least one subsequent second APU is located further from the CPU than the first APU.

7. The method according to claim 1, wherein the radio stripe system has a tree structure and the first APU is connected to two subsequent second APUs located further away from the CPU and wherein the effective precoded channels are transmitted to both subsequent second APUs.

8. A method, performed by a second Antenna Processing Unit (APU) for sequential transmit precoding in a radio stripe system, wherein the radio stripe system comprises at least two APUs and a Central Processing Unit (CPU), the at least two APUs being connected in series from the CPU, wherein the radio stripe system serves at least two User Equipment (UEs), the method comprising:
obtaining channel estimates for channels to the at least two UEs;
receiving effective precoded channels from at least one preceding first APU;
determining a precoding filter based on the obtained channel estimates and the received effective precoded channels from said at least one preceding first APU, wherein the precoding filter is going to be applied to signals that are to be transmitted from the second APU to the at least two UEs;
receiving data signals from the CPU;
applying the determined precoding filter to the received data signals to generate a precoded signal; and transmitting the precoded signal to the at least two UEs served by the radio stripe system.

9. The method according to claim 8, wherein the method further comprises:
determining effective precoded channels for the signals to the at least two UEs based on the determined precoding filter and the obtained channel estimates, wherein the effective precoded channels represent the effective channel created after the precoding filter being applied to each channel for the at least two UEs; and
transmitting the effective precoded channels to at least one subsequent third APU located further from the CPU.

10. The method according to claim 8, wherein the obtained channel estimates are Channel State Information (CSI) obtained from reference pilot signals transmitted by the at least two UEs served by the radio stripe system.

11. The method according to claim 8, wherein the precoding filter is generated by a method selected from the group comprised of: maximum-ratio transmission (MRT) zero-forcing (ZF) precoding and signal-to-interference-and-leakage ratio (SLNR) precoding.

12. The method according to claim 8, wherein the at least one preceding first APU is located closer the CPU than the second APU.

13. The method according to claim 8, wherein each of the at least two APUs in the radio stripe system is equipped with one antenna.

14. A first Antenna Processing Unit (APU) for sequential transmit precoding in a radio stripe system, wherein the radio stripe system comprises at least two APUs and a Central Processing Unit (CPU), the at least two APUs being connected in series from the CPU, wherein the radio stripe system serves at least two User Equipment (UEs), the first APU comprising:
a processing circuitry; and
a memory circuitry storing computer program code which, when run in the processing circuitry, causes the first APU to:
obtain channel estimates for channels to the at least two UEs;
determine a precoding filter based on the obtained channel estimates, wherein the precoding filter is going to be applied to signals that are to be transmitted from the first APU to the at least two UEs;
determine effective precoded channels for the signals to the at least two UEs based on the determined precoding filter and the obtained channel estimates, wherein the effective precoded channels represent the effective channel created after the precoding filter being applied to each channel for the at least two UEs; and
transmit the effective precoded channels to at least one subsequent second APU.

15. A second Antenna Process Unit (APU) for sequential transmit precoding in a radio stripe system, wherein the radio stripe system comprises at least two APUs and a Central Processing Unit (CPU), the at least two APUs being connected in series from the CPU, wherein the radio stripe system serves at least two User Equipment (UEs), the second APU comprising:
a processing circuitry; and
a memory circuitry storing computer program code which, when run in the processing circuitry, causes the second APU to:
obtain channel estimates for channels to the at least two UEs;
receive effective precoded channels from at least one preceding first APU;
determine a precoding filter based on the obtained channel estimates and the received effective precoded channels from said at least one preceding first APU, wherein the precoding filter is going to be applied to signals that are to be transmitted from the second APU to the at least two UEs;
receive data signals from the CPU;
apply the determined precoding filter to the received data signals to generate a precoded signal; and
transmit the precoded signal to the at least two UEs served by the radio stripe system.

\* \* \* \* \*